United States Patent
Ogawara

(10) Patent No.: US 9,998,968 B2
(45) Date of Patent: Jun. 12, 2018

(54) COMMUNICATION SYSTEM, COMMUNICATION CONTROL SYSTEM, COMMUNICATION APPARATUS, COMMUNICATION METHOD, AND CONNECTION PROGRAM

(71) Applicant: Osamu Ogawara, Kanagawa (JP)

(72) Inventor: Osamu Ogawara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days. days.

(21) Appl. No.: 14/911,495

(22) PCT Filed: Aug. 6, 2014

(86) PCT No.: PCT/JP2014/071354
§ 371 (c)(1),
(2) Date: Feb. 11, 2016

(87) PCT Pub. No.: WO2015/033748
PCT Pub. Date: Mar. 12, 2015

(65) Prior Publication Data
US 2016/0192259 A1    Jun. 30, 2016

(30) Foreign Application Priority Data

Sep. 6, 2013  (JP) .................................. 2013-185113
Jun. 2, 2014  (JP) .................................. 2014-114311

(51) Int. Cl.
*H04W 36/14*    (2009.01)
*H04W 76/02*    (2009.01)
(Continued)

(52) U.S. Cl.
CPC .......... *H04W 36/14* (2013.01); *H04B 17/309* (2015.01); *H04W 4/003* (2013.01);
(Continued)

(58) Field of Classification Search
CPC ..... H04W 8/005; H04W 84/12; H04W 48/16; H04W 4/003; H04W 36/14; H04W 76/02; H04W 92/08; H04W 92/18; H04B 17/309
See application file for complete search history.

(56) References Cited

U.S. PATENT DOCUMENTS

| 7,567,819 B2 | 7/2009 | Alone et al. |
| 8,767,573 B2 * | 7/2014 | Goto ..................... H04W 28/18 370/252 |

(Continued)

FOREIGN PATENT DOCUMENTS

| EP | 2 498 551 A1 | 9/2012 |
| JP | H08-152415 | 6/1996 |

(Continued)

OTHER PUBLICATIONS

Extended European Search Report dated Jul. 25, 2016 in Patent Application No. 14842228.0.

(Continued)

*Primary Examiner* — Liton Miah
(74) *Attorney, Agent, or Firm* — Oblon, McClelland, Maier & Neustadt, L.L.P.

(57) ABSTRACT

A communication system allowing to speedily conduct a wireless connection between communication apparatuses, includes a display apparatus and an information terminal. The display apparatus includes: a unit producing an SSID including specific information specifying a setting table in which is stored setting information used in wireless communication between the display apparatus and the information terminal; a transmission unit that transmits one or more beacons including the produced SSID. The information terminal includes: a unit which identifies, of received beacons, a beacon which has the specific information included in an SSID and whose received strength meets a predetermined condition; and a unit which sets, in the information (Continued)

terminal, the setting information used in wireless communication between the display apparatus and the information terminal using a setting table specified by the specific information included in the SSID of the identified beacon.

9 Claims, 17 Drawing Sheets

(51) Int. Cl.
*H04W 84/12* (2009.01)
*H04W 92/08* (2009.01)
*H04W 92/18* (2009.01)
*H04W 4/00* (2018.01)
*H04W 8/00* (2009.01)
*H04W 48/16* (2009.01)
*H04B 17/309* (2015.01)

(52) U.S. Cl.
CPC .......... *H04W 8/005* (2013.01); *H04W 48/16* (2013.01); *H04W 76/02* (2013.01); *H04W 84/12* (2013.01); *H04W 92/08* (2013.01); *H04W 92/18* (2013.01)

(56) References Cited

U.S. PATENT DOCUMENTS

| | | | |
|---|---|---|---|
| 8,958,402 B2 | 2/2015 | Ota et al. | |
| 2005/0042999 A1* | 2/2005 | Rappaport | H04B 1/719 455/307 |
| 2006/0003756 A1* | 1/2006 | Kumaki | H04N 7/17309 455/418 |
| 2009/0037591 A1 | 2/2009 | Sakai | |
| 2009/0175250 A1 | 7/2009 | Mathur et al. | |
| 2009/0238093 A1 | 9/2009 | Saneto | |
| 2009/0310583 A1 | 12/2009 | Suzuki | |
| 2010/0202767 A1* | 8/2010 | Shirakawa | G03B 15/05 396/56 |
| 2010/0290074 A1* | 11/2010 | Kuroishi | G03G 15/5004 358/1.14 |
| 2011/0116398 A1* | 5/2011 | Nakahara | H04W 52/0216 370/252 |
| 2011/0249198 A1 | 10/2011 | D'Alessio et al. | |
| 2012/0033568 A1* | 2/2012 | Park | H04W 76/023 370/252 |
| 2012/0146775 A1 | 6/2012 | Kudo et al. | |
| 2012/0294234 A1* | 11/2012 | Bradish | H04W 4/04 370/328 |
| 2013/0057591 A1 | 3/2013 | Sugiyama | |
| 2013/0176897 A1* | 7/2013 | Wang | H04W 12/06 370/254 |

FOREIGN PATENT DOCUMENTS

| | | |
|---|---|---|
| JP | 2004-140778 | 5/2004 |
| JP | 2006-148471 | 6/2006 |
| JP | 2006-163793 | 6/2006 |
| JP | 2006-254301 | 9/2006 |
| JP | 2007-135146 | 5/2007 |
| JP | 2008-517553 | 5/2008 |
| JP | 2009-38594 | 2/2009 |
| JP | 2009-089004 | 4/2009 |
| JP | 2009-231971 | 10/2009 |
| JP | 2009-231972 | 10/2009 |
| JP | 2009-302874 | 12/2009 |
| JP | 2011-35581 | 2/2011 |
| JP | 2011-166600 | 8/2011 |
| JP | 2011-188238 | 9/2011 |
| JP | 2013-066175 | 4/2013 |

OTHER PUBLICATIONS

International Search Report dated Oct. 28, 2014 in PCT/JP2014/071354 filed on Aug. 6, 2014.
Japanese Office Action dated Jul. 22, 2014, issued to Basic Japanese Patent Application No. 2014-114311 filed on Jun. 2, 2014.
Japanese Office Action dated Sep. 1, 2015, issued to Related Japanese Patent Application No. 2014-244611 filed on Dec. 3, 2014.
Katsuya Sotomura, "A guide to Perfect Usage of Connecting and Using Wi Fi from a PC or a smartphone", published by ASCII Media Works, Japan, ASCII. PC Separate Appendix Volume Special Preservation version issued in May 2002 pp. 23 to 27.
Office Action dated Mar. 8, 2016 in Japanese Patent Application No. 2014-244611.

* cited by examiner

FIG.7A

|  |  | SETTING 1 |
|---|---|---|
|  | COMMUNICATION MODE | AD-HOC |
|  | AUTHENTICATION SCHEME | OPEN SYSTEM |
|  | ENCRYPTION SCHEME | WEP(Pass:XXX) |
|  | FREQUENCY CHANNEL | 11 |
|  | TRANSMISSION STANDARD | IEEE802.11n |
|  | COMMUNICATION PROTOCOL | IPv4 |
|  | IPv4 ADDRESS OF WIRELESS APPARATUS TO BE CONNECTED | 169.254.1.1 |
|  | IPv4 SUBNET MASK ADDRESS | 255.255.0.0 |

FIG.7B

|  |  | SETTING 2 |
|---|---|---|
|  | COMMUNICATION MODE | SOFT AP MODE |
|  | AUTHENTICATION SCHEME | OPEN SYSTEM |
|  | ENCRYPTION SCHEME | WPA(Pass:XXX) |
|  | FREQUENCY CHANNEL | 13 |
|  | TRANSMISSION STANDARD | IEEE802.11n |
|  | COMMUNICATION PROTOCOL | IPv4 |
|  | IPv4 ADDRESS OF WIRELESS APPARATUS TO BE CONNECTED | 169.254.1.1 |
|  | IPv4 SUBNET MASK ADDRESS | 255.255.0.0 |

FIG.7C

|  |  | SETTING 3 |
|---|---|---|
|  | COMMUNICATION MODE | AD-HOC |
|  | AUTHENTICATION SCHEME | OPEN SYSTEM |
|  | ENCRYPTION SCHEME | WPA(Pass:XXX) |
|  | FREQUENCY CHANNEL | 11 |
|  | TRANSMISSION STANDARD | IEEE802.11n |
|  | COMMUNICATION PROTOCOL | IPv6 |
|  | IPv6 ADDRESS OF WIRELESS APPARATUS TO BE CONNECTED | 2001:0db8:bd05:01d2:288a:1fc0:0001:10ee |
|  | IPv6 PREFIX | 2001:0db8:bd05:01d2 |

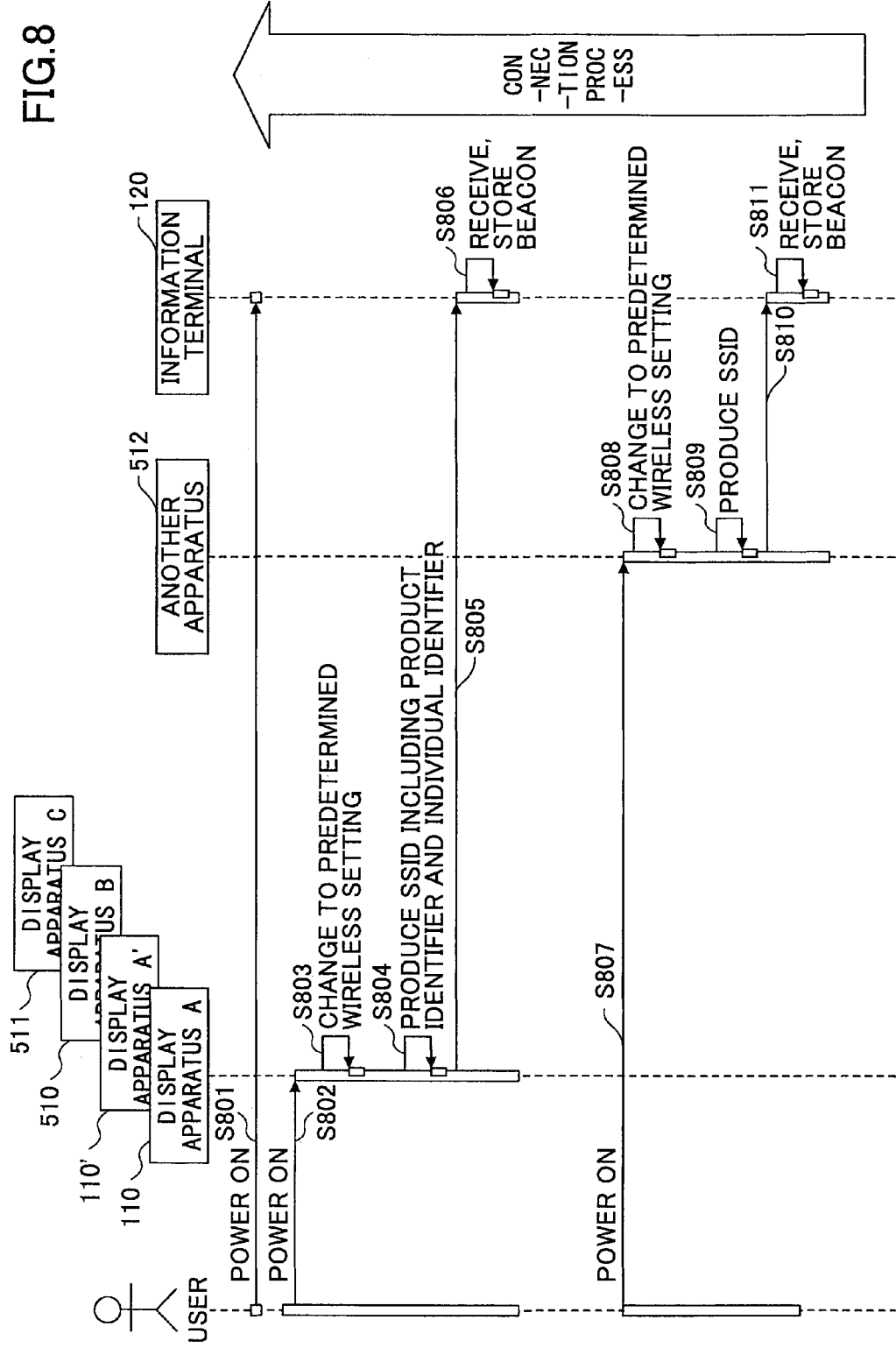

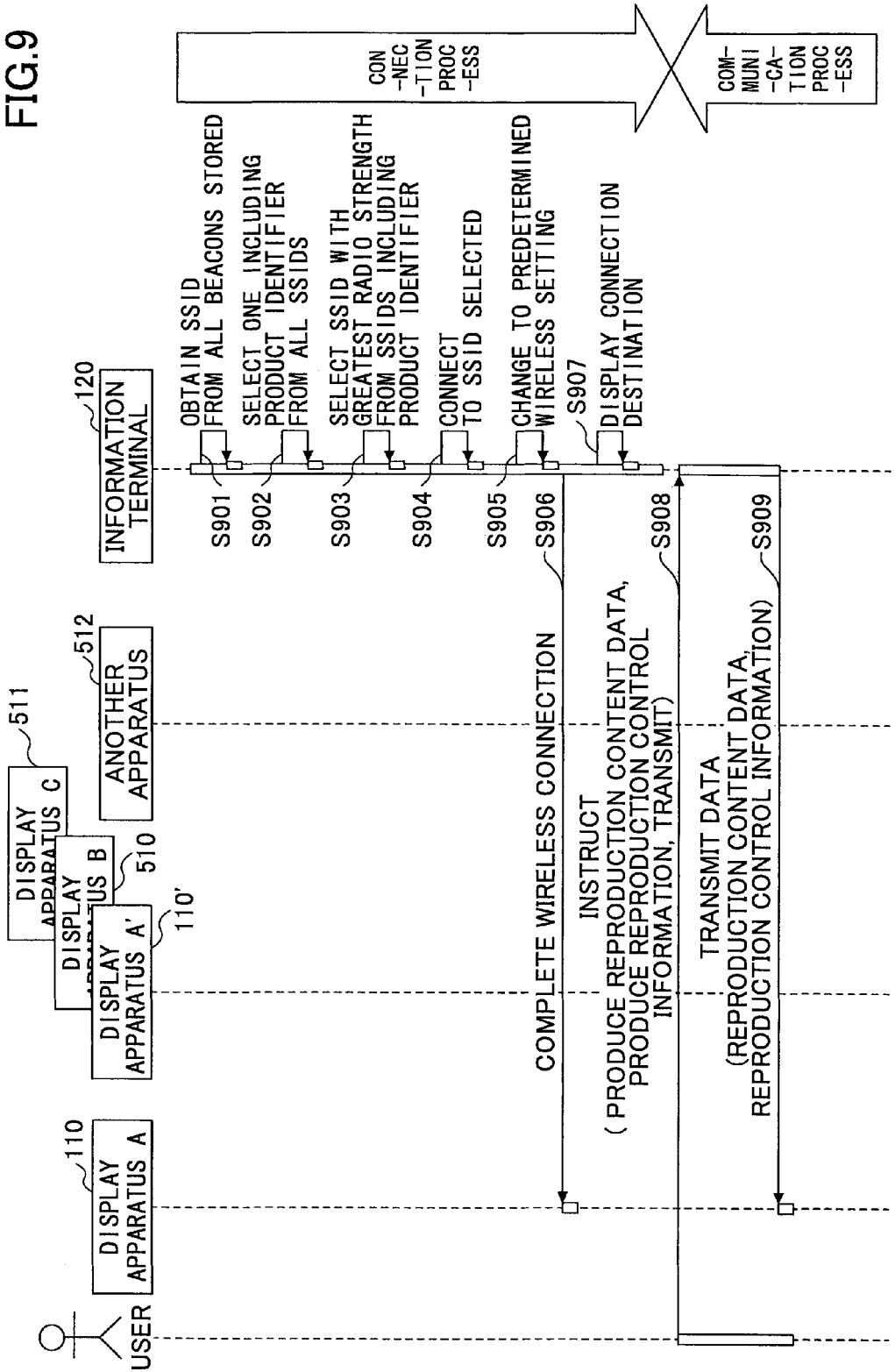

FIG.10

| NETWORK NAME | SETTING TABLE | RECEIVED STRENGTH |
|---|---|---|
| SSID(A) | SETTING 1 | ○○dB |
| SSID(A') | SETTING 1 | △△dB |
| SSID(B) | SETTING 2 | □□dB |
| SSID(C) | SETTING 3 | ××dB |

FIG.16A 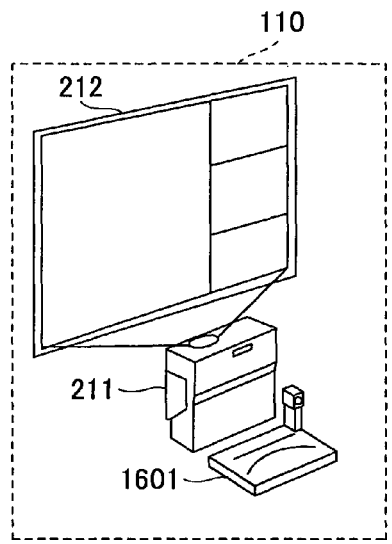 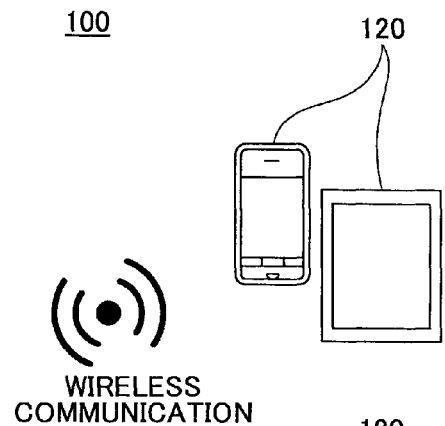
WIRELESS COMMUNICATION
FIG.16B 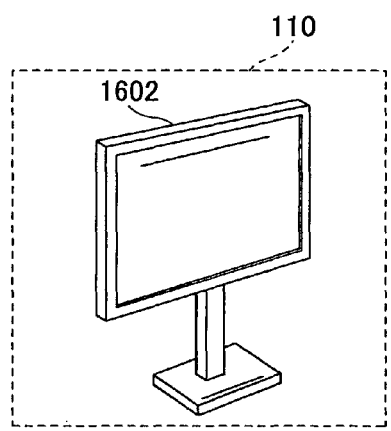 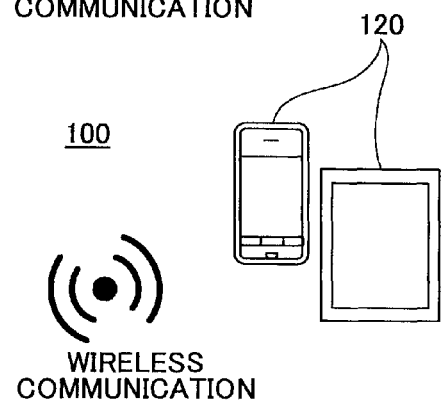
WIRELESS COMMUNICATION
FIG.16C 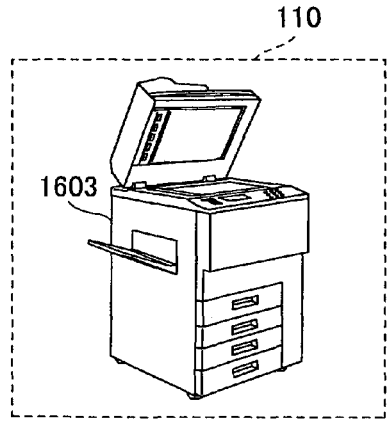 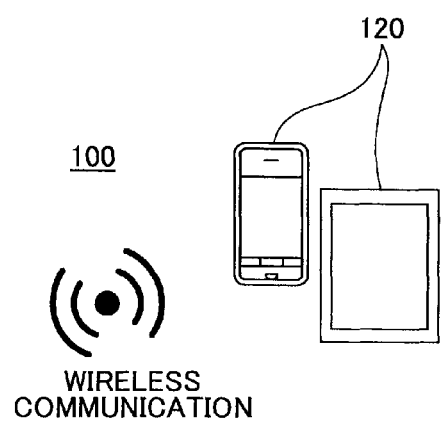
WIRELESS COMMUNICATION

COMMUNICATION SYSTEM, COMMUNICATION CONTROL SYSTEM, COMMUNICATION APPARATUS, COMMUNICATION METHOD, AND CONNECTION PROGRAM

TECHNICAL FIELD

The present invention relates to wireless connection techniques, and, more specifically, to communication systems, communication control systems, communication apparatuses, communication methods, and connection programs.

BACKGROUND ART

In the related art, various systems are known for wirelessly connecting electronic apparatuses together via a network, and transmitting/receiving data.

Generally, in order to transmit/receive the data via the network, a communication apparatus on the connection source side needs to specify the network to be a connection destination and conduct settings (for example, setting an IP address, a subnet mask, an authentication scheme, an encryption scheme, an encryption key, etc.) However, there are problems that conducting the above-mentioned settings is not easy for a user, and that a certain amount of time is required before the connection is completed. Therefore, in the related art, various proposals are being made for speedily making wireless connections to the network and facilitating connection operations for the user.

For example, in Patent documents 1 and 2 are disclosed proposed features in which a communication apparatus on the connection destination side produces an SSID (Service Set Identifier) in which are described an individual identifier (for example, an apparatus name) and an IP address of the own apparatus.

There is an advantage that the features disclosed in the above-mentioned related-art documents make it possible for the communication apparatus on the connection source side to conduct a setting necessary for wireless communication based on information included in a received beacon, facilitating connection operations for the user. Moreover, there is also an advantage that it is not necessary for the communication apparatus on the connection source side to conduct scanning to search for a network to be a connection destination, making it possible to reduce scan time.

However, with the features disclosed in Patent documents 1 and 2, it is necessary to transmit results of the setting in the communication apparatus on the connection source side to the communication apparatus on the connection designation side and determine, in the communication apparatus on the connection destination side, whether communication with the results of the setting is possible. Thus, there is a problem that some time is needed from when a setting necessary for wireless communication is conducted in the communication apparatus on the connection source side to when transmission and reception of data are actually started.

SUMMARY OF THE INVENTION

Means for Solving the Problems

In light of solving the problem as described above, an object of the present invention is to make it possible to speedily conduct a wireless connection between communication apparatuses.

In order to achieve the above-described object, the present invention adopts the features as follows. In other words, a communication system is provided, including a first communication apparatus and a second communication apparatus, wherein the first communication apparatus includes a production unit which produces a network identifier including specific information specifying a setting table in which is stored setting information used in wireless communication between the first communication apparatus and the second communication apparatus; and a transmission unit which transmits one or more signals including the network identifier produced by the production unit, and wherein the second communication apparatus includes an identification unit which identifies, of the signals which are received, a signal which has the specific information included in the network identifier and whose received strength meets a predetermined condition; and a setting unit which sets, in the second communication apparatus, setting information used in wireless communication between the first communication apparatus and the second communication apparatus using a setting table specified by the specific information included in the network identifier of the identified signal.

Embodiments of the present invention make it possible to speedily conduct a wireless connection between communication apparatuses.

BRIEF DESCRIPTION OF THE DRAWINGS

FIGS. 7A, 7B, and 7C are diagrams illustrating exemplary setting tables in which is stored setting information used in wireless communication;

FIG. 8 is one sequence diagram illustrating a flow of a connection process in the reproduction system;

FIG. 9 is another sequence diagram illustrating the flow of the connection process in the reproduction system;

FIG. 10 is a diagram for explaining a process for determining a connection destination;

FIGS. 16A to 16C are diagrams illustrating one example of a system configuration when a communication system is configured using various equipment units as display apparatuses.

MODE FOR CARRYING OUT THE INVENTION

Below, the respective embodiments of the present invention are described with reference to the drawings. A wireless connection technique according to the below-described respective embodiments is realized in a reproduction system which includes an information terminal and a display apparatus, for example. More specifically, it is realized in a reproduction system, wherein the information terminal produces reproduction control information, which is information on reproduction of content data, and transmits it with the content data to a display apparatus to reproduce the content data based on the reproduction control information in the display apparatus.

In other words, the below-described reproduction system is one example of a communication system according to the present invention, and an information terminal and a display apparatus which make up the reproduction system are one example of a communication apparatus according to the present invention. Moreover, a reproduction control system including a program for connecting the information terminal and the display apparatus is one example of a communication control system according to the present invention.

Below, the reproduction system, as well as the information terminal and the display apparatus which make up the reproduction system, is described in detail, after which details of a wireless connection technique of the respective embodiments realized in the reproduction system are described.

First Embodiment

System Configuration of Reproduction System

Figure 1:
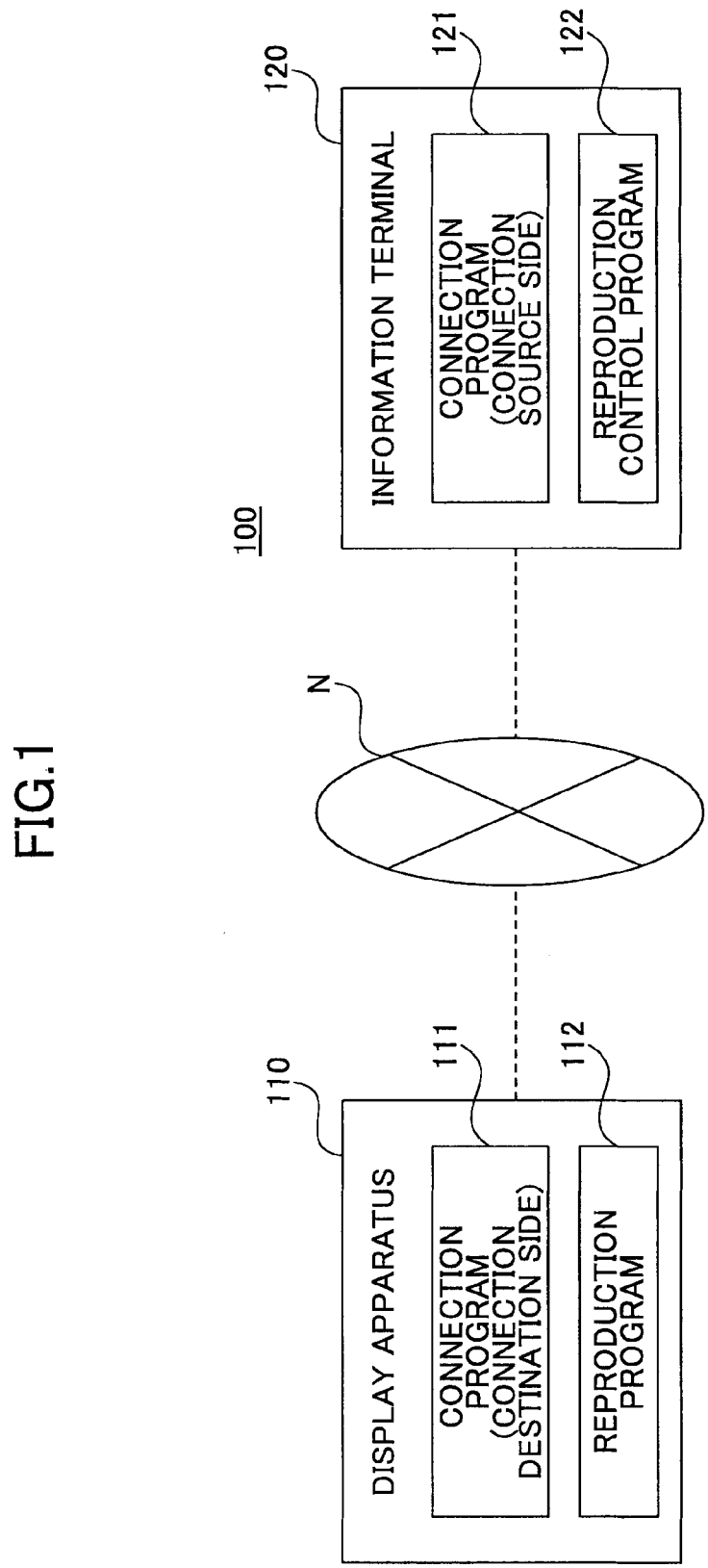
FIG. 1 is a diagram illustrating a system configuration of a reproduction system which is one example of a communication system according to an embodiment.

First, a system configuration of a reproduction system realized by a wireless connection technique is described. FIG. 1 is a diagram illustrating one example of a system configuration of a reproduction system 100 in which a wireless connection technique is realized according to the present embodiment.

The reproduction system 100 includes a display apparatus 110 and an information terminal 120 as one example of a communication apparatus according to the present embodiment. In the reproduction system 100, the information terminal 120 and the display apparatus 110 are communicatively connected via a data transmission line N such as a network, etc.

The information terminal 120 is configured to conduct communication by a communication scheme which is compliant with standards such as 3G ($3^{rd}$ generation), LTE (Long Term Evolution), 4G ($4^{th}$ generation), etc., for example. The information terminal 120 may be configured to conduct communication by a communication scheme which is compliant with ZigBee (registered trademark), Bluetooth (registered trademark), etc., for example.

The information terminal 120 may be, for example, a wireless communication terminal such as a smartphone, a mobile phone, etc., a tablet PC (personal computer), or a notebook PC, as long as it is any equipment unit which may conduct communication with the display apparatus 110.

In the information terminal 120 are installed a connection program (on the connection source side) 121 and a reproduction control program 122 according to the present embodiment. The information terminal 120 wirelessly connects to the display apparatus 110 by executing the connection program (the connection source side) 121. Moreover, the reproduction control program 122 is executed while the information terminal 120 is wirelessly connected to the display apparatus 110 to produce reproduction control information on content data displayed on the display apparatus 110 and transmit the produced results with the content data to the display apparatus 110.

In the display terminal 110 are installed a connection program (on the connection destination side) 111 and a reproduction program 112. The display apparatus 110 can execute the connection program (the connection destination side) 111 to conduct a setting necessary for wireless communication in the information terminal 120. Moreover, the reproduction program 112 may be executed to reproduce content data transmitted from the information terminal 120 based on reproduction control information.

The display apparatus 110 may include a display function of displaying content data based on reproduction control information transmitted from the information terminal 120, and may be an equipment unit such as a projector, a display, etc.

In the explanations of the present embodiments, displaying of content data by the display apparatus 110 in accordance with reproduction control information is expressed as reproducing content data.

Moreover, the content data in the explanations of the present embodiments include image (still picture) data, video data, etc., for example. Moreover, image data to be content data may be image data including one image, for example, or may be image data sets including multiple images. In other words, the content data in the explanations of the present embodiments may be any data as long as they are data which can be reproduced at the display apparatus 110.

In the below-described explanations of the respective embodiments, content data reproduced in the display apparatus 110 are called reproduction content data, while other content data, such as those which are stored in a predetermined storage area, for example, are merely called content data.

Explanation of Usage Scene of Reproduction System

Figure 2:
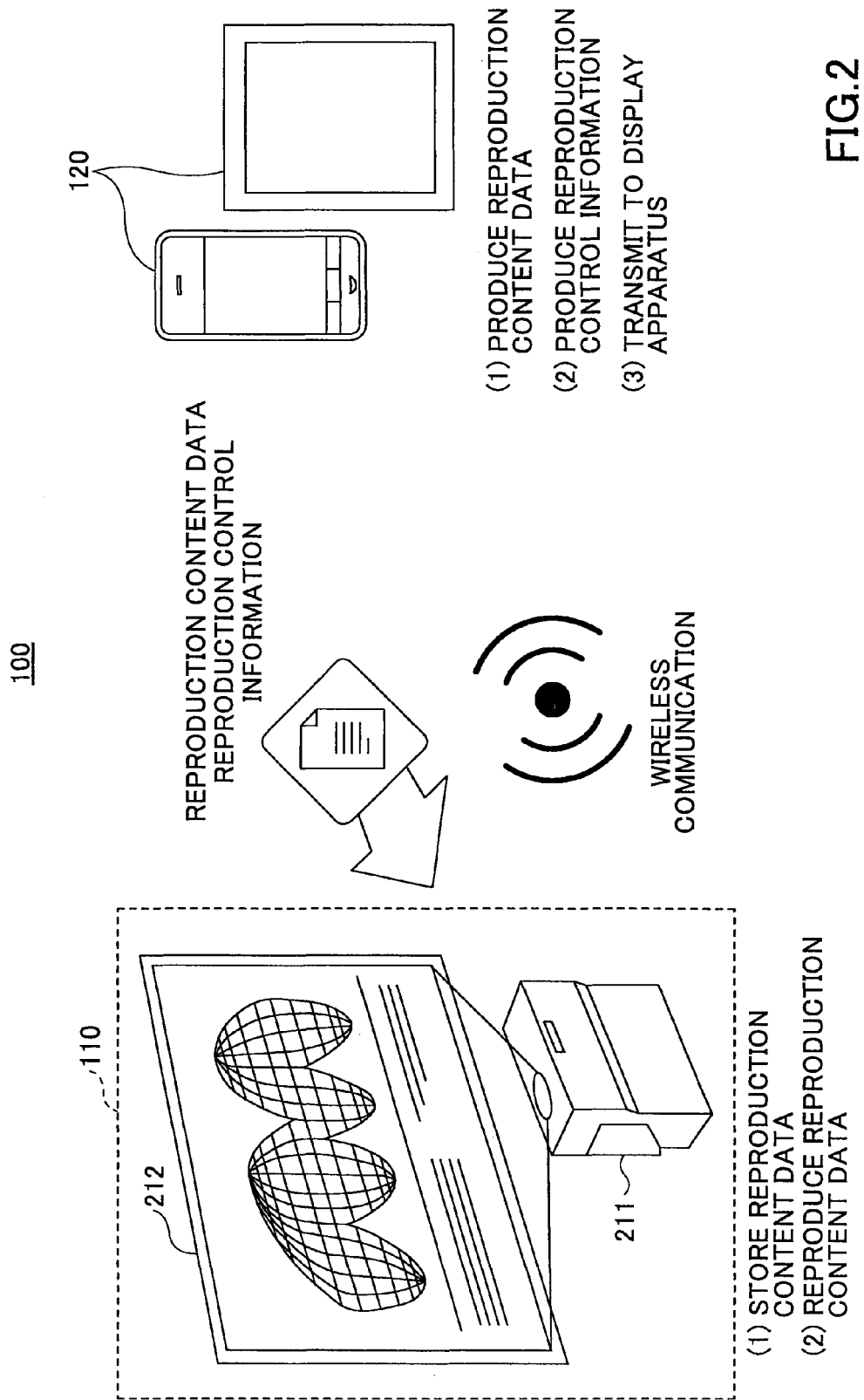
FIG. 2 is a diagram for explaining one example of a usage scene of the reproduction system.

Next, a usage scene of the reproduction system 100 is explained with reference to FIG. 2. FIG. 2 is a diagram for explaining one example of a usage scene of the reproduction system 100.

In the example of FIG. 2, the reproduction system 100 is shown which uses a smartphone or a tablet PC as the information terminal 120 and uses a projector 211 and a screen 212 as the display apparatus 110. The reproduction system 100 may be utilized as a digital signage, for example.

In the information terminal 120, when content data are selected by a user, reproduction content data are produced. Moreover, when a method of reproducing reproduction content data is set, reproduction control information for the reproduction content data is produced based on the setting.

Then, in the information terminal 120, the reproduction content data and the reproduction control information are transmitted to the projector 211. In the projector 211, received reproduction content data are stored in a storage unit 312 (described below) and the reproduction content data are reproduced in accordance with reproduction control information.

In this way, according to the reproduction system 100, a user may transmit the reproduction content data and the reproduction control information once from the information terminal 120 to the display apparatus 110 to cause the reproduction content data to be reproduced in the display apparatus 110 continuously as desired.

In other words, when the reproduction system 100 is utilized for the digital signage, etc., the desired reproduction content data are reproduced automatically, so that the need is eliminated for the user to conduct settings related to a display sequence of the reproduction content data and switching of a display on all such occasions.

Hardware Configuration of Reproduction System

Figure 3:
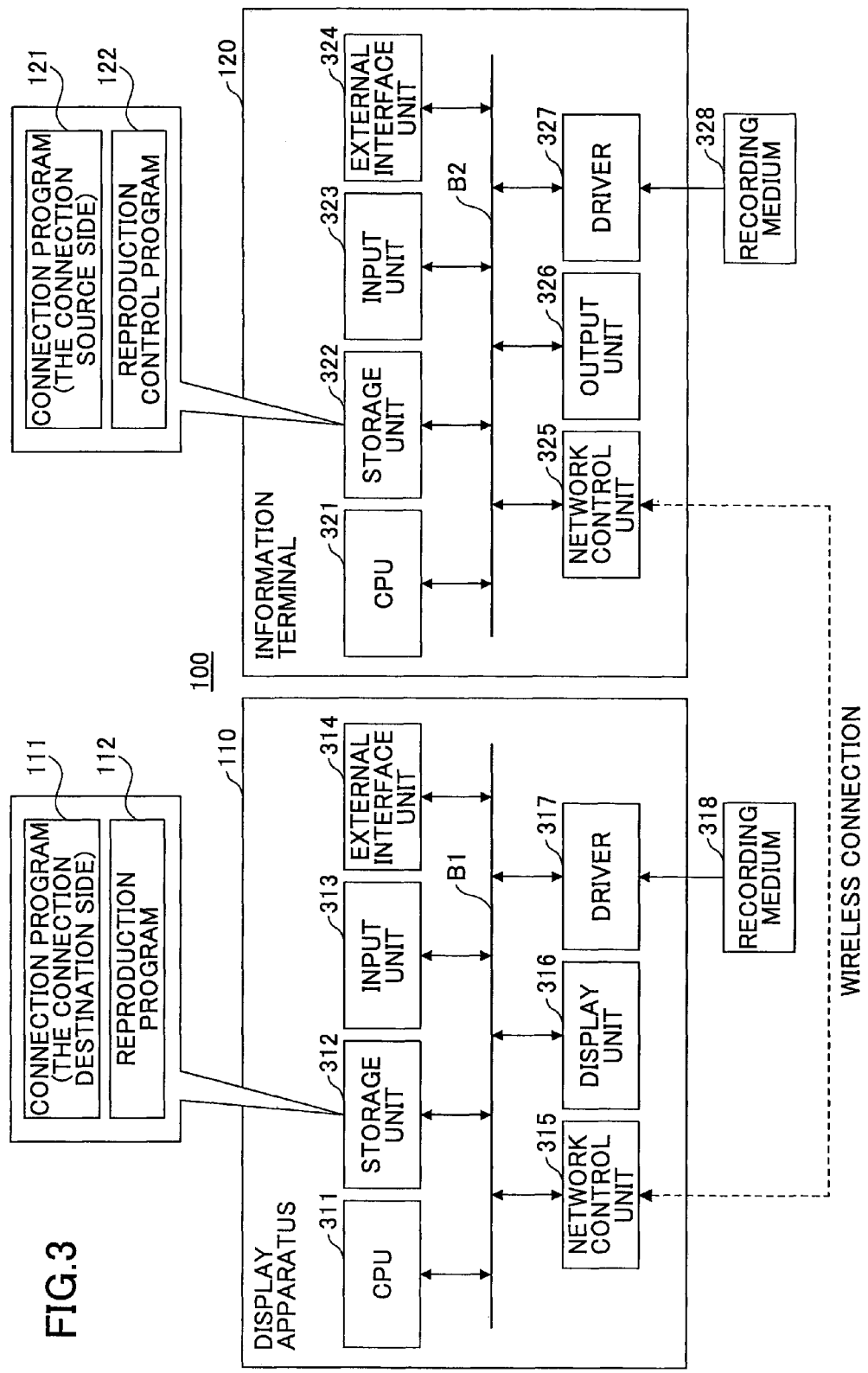
FIG. 3 is a diagram for explaining one example of a hardware configuration of the respective apparatuses included in the reproduction system.

Next, a hardware configuration of the respective apparatuses included in the reproduction system 100 is explained with reference to FIG. 3. FIG. 3 is a diagram illustrating one example of the hardware configuration of the respective apparatuses (the display apparatus 110 and the information terminal 120) included in the reproduction system 100.

The information terminal 120 includes a CPU (central processing unit) 321, a storage unit 322, an input unit 323, an external interface unit 324, a network control unit 325, an output unit 326, and a driver 327. These elements are mutually connected via a bus B2.

The CPU 321 is a computer which controls various operations of the information terminal 120. The storage unit 322 stores various programs including a reproduction control program 122 and a connection program (the connection source side) 121 that are executed in the information terminal 120; and various information sets on the process and operation of the information terminal 120. The input unit 323 is used for inputting various signals and information. The input unit 323 may include a display function such as a touch panel, etc., for example. Moreover, the input unit 323 may be a pointing device, a keyboard, etc., for example.

The external interface unit 324 may be a USB (universal serial bus) memory slot, NFC (near-field communication), etc., for example. The network control unit 325, which includes a modem, a LAN card, etc., is used for wirelessly connecting to the network and conducting wireless communication.

The output unit 326 is used for externally outputting various information sets from the information terminal 120. The output unit 326 may be, for example, a display, etc., or may be a transmitting unit which transmits various data sets to an external apparatus.

The connection program (the connection source side) 121 and the reproduction control program 122 according to the present embodiment are at least a part of various programs which control the information terminal 120 and are provided by downloading from a network, distribution of a recording medium 328, etc., for example.

Here, the recording medium 328 having stored therein the connection program (the connection source side) 121 and the reproduction control program 122 may be combined with the display apparatus 110 and provided to the user as a reproduction control system. Alternatively, it may be provided to the user separately from the display apparatus 110. In other words, only the recording medium 328 having stored therein the connection program (the connection source side) 121 and the reproduction control program 122 may be provided solely to the user. Alternatively, only the connection program (the connection source side) 121 and the reproduction control program 122 may be solely downloaded to provide the downloaded results to the user. Of course, they may be provided to the user with the information terminal 120 in which they are installed from the beginning.

For the recording medium 328 having recorded therein the connection program (the connection source side) 121 and the reproduction control program 122, a recording medium which optically, electrically, or magnetically records information, such as a CD-ROM, a flexible disk, an opto-magnetic disk, etc., may be used. Alternatively, a recording medium such as a semiconductor memory that electrically records information may be used, such as a ROM, a flash memory, etc.

When the recording medium 328 having recorded therein the connection program (the connection source side) 121 and the reproduction control program 122 is set to the driver 327, the connection program (the connection source side) 121 and the reproduction control program 122 are installed in the storage unit 322 from the recording medium 328. When the connection program (the connection source side) 121 and the reproduction control program 122 are downloaded from the network, they are installed in the storage unit 322 via the network control unit 325.

The storage unit 322 stores therein various programs including the installed connection program (the connection source side) 121 and reproduction control program 122 as well as necessary files, data, etc. In accordance with the connection program (the connection source side) 121 and the reproduction control program 122 that are stored in the storage unit 322, the CPU 321 realizes various processes (connection process, etc.) as described below.

The display apparatus 110 includes a CPU 311, a storage unit 312, an input unit 313, an external interface unit 314, a network control unit 315, a display unit 316, and a driver 317 that are mutually connected via a bus B1.

The CPU 311 is a computer which controls various operations of the display apparatus 110. The storage unit 312 stores therein reproduction content data which are reproduced by the display apparatus 110, various programs including the connection program (the connection destination side) 111 and the reproduction program 112 that are executed by the display apparatus 110, and various information sets on the process and the operation of the display apparatus 110. The input unit 313 is used for inputting various signals and information. The input unit 313 is an operation member which operates the display apparatus 110, for example.

The external interface unit 314 may be a USB (universal serial bus) memory slot, NFC (near-field communication), etc., for example. The network control unit 315 controls wireless communication between the display apparatus 110 and the information terminal 120, for example. The display unit 316 reproduces reproduction content data which the display apparatus 110 is instructed to reproduce.

The connection program (the connection destination side) 111 and the reproduction program 112 are at least apart of various programs which control the display apparatus 110. The connection program (the connection destination side) 111 and the reproduction program 112 are provided by downloading from the network, distribution of a recording medium 318, etc., for example.

When the recording medium 318 having recorded therein the connection program (the connection destination side)

111 and the reproduction program 112 is set to the driver 317, the connection program (the connection destination side) 111 and the reproduction control program 112 are installed in the storage unit 312 from the recording medium 318. Moreover, when the connection program (the connection destination side) 111 and the reproduction control program 112 are downloaded from the network, they are installed in the storage unit 312 via the network control unit 315.

The storage unit 312 stores the installed connection program (the connection destination side) 111 and the reproduction program 112 and stores data such as necessary files and reproduction content data, etc. In accordance with the connection program (the connection destination side) 111 and the reproduction control program 112 that are stored in the storage unit 312, the CPU 311 realizes various processes (connection process, etc.) as described below.

Functional Configuration Related to Wireless Connection in Reproduction System

Figure 4A:
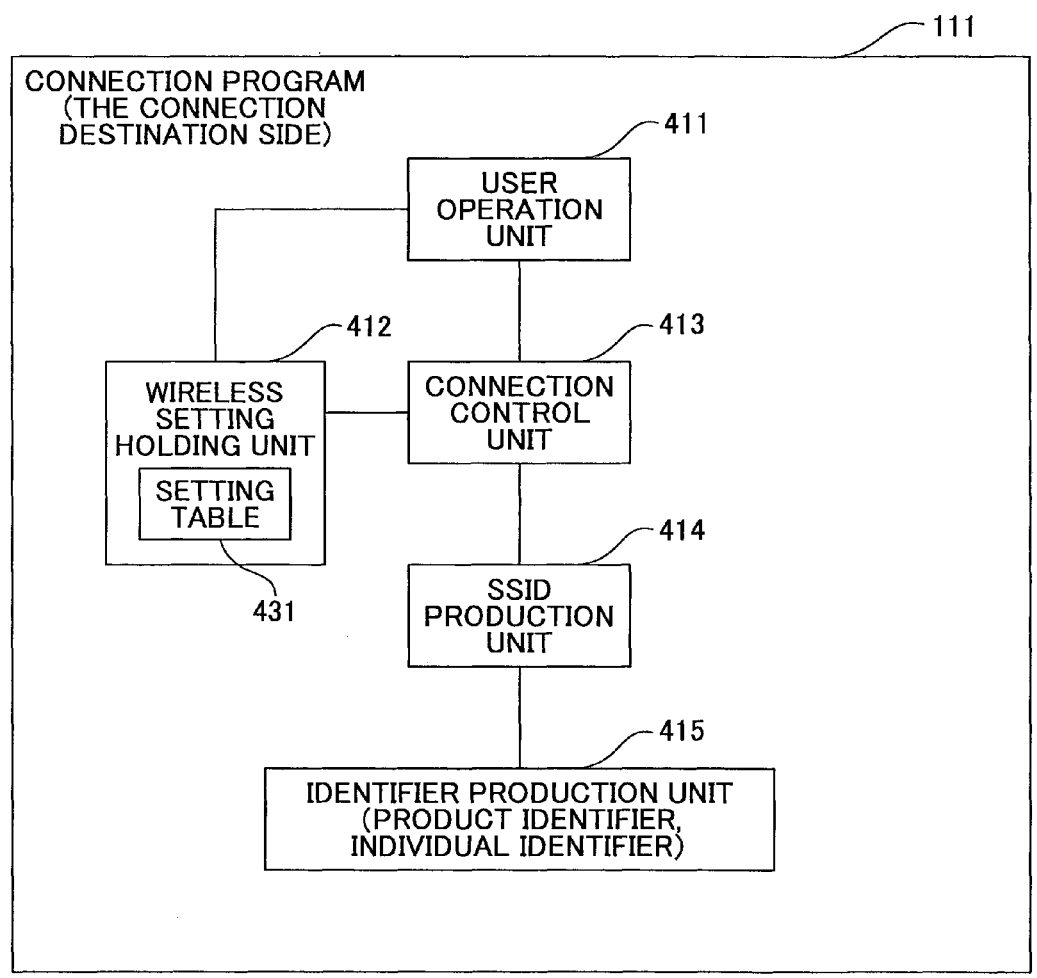
FIGS. 4A and 4B are diagrams for explaining one example of a functional configuration related to a wireless connection of the respective apparatuses included in the reproduction system.
Figure 4B:
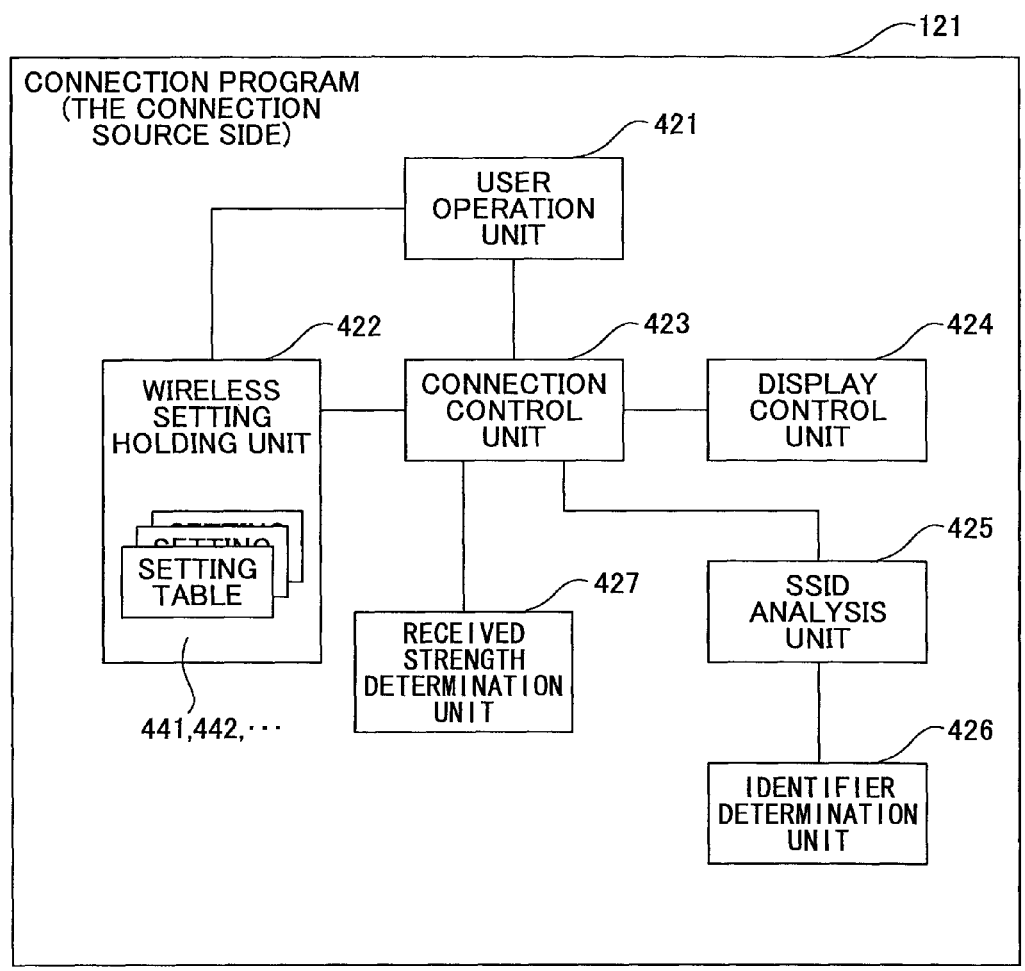

Next, with reference to FIGS. 4A and 4B, functional configuration related to a wireless connection of the respective apparatuses (the display apparatus 110, the information terminal 120) included in the reproduction system 100 is described. FIGS. 4A and 4B are diagrams illustrating one example of the functional configuration related to the wireless connection of the respective apparatuses (the display apparatus 110 and the information terminal 120) included in the reproduction system 100.

FIG. 4A shows a function which is realized by the connection program (the connection destination side) 111 included in the display apparatus 110 being executed by the CPU 311 as a function related to wireless connection of the display apparatus 110.

As shown in FIG. 4A, the display apparatus 110 includes a user operation unit 411, a wireless setting holding unit 412, a connection control unit 413, an SSID production unit 414, and an identifier production unit 415.

The user operation unit 411 accepts, from a user, various operations for conducting wireless connection. The present embodiment is configured such that, when the power of the display apparatus 110 is turned on, the connection program (the connection destination side) 111 is launched, and the operation to turn on the power of the display apparatus 110 is accepted by the user operation unit 411.

When the display apparatus 110 wirelessly communicates with the information terminal 120, the wireless setting holding unit 412 holds a setting table 431 which has stored therein setting information which is set in the display apparatus 110. Details of the setting table will be described below.

The connection control unit 413 controls production and transmission of a beacon (a signal including at least a network identifier) such that the information terminal 120 may wirelessly connect, and sets, within the display apparatus 110, setting information of the setting table 431 held in the wireless setting holding unit 412.

The SSID production unit 414 produces an SSID (service set identifier) to be included in the beacon. Here, the SSID is a network identifier which identifies a network; a common SSID is set among the respective communication apparatuses in an ad-hoc mode (a mode in which communication is conducted without going through an access point).

The identifier production unit 415 produces a product identifier and an individual identifier that are described in the SSID. The product identifier is an identifier which shows the product type of the display apparatus 110. The display apparatuses having the same product identifier indicate that they are of the same product type, so that (even when they are separate apparatuses) the same connection program (the connection destination side) 111 operates and the same setting table 431 is used for wireless communication.

In other words, in the display apparatuses in which the same connection program (the connection destination side) 111 operates and the same setting table is used, the same product identifier is produced. Here, it is based on an assumption that the connection program (the connection destination side) 111 differ for each product type, the product identifier is defined as an identifier which indicates the product type of the display apparatus 110. However, the present invention is not limited to such an assumption.

When the connection program (the connection destination side) 111 is installed in a manner unrelated to the product type of the display apparatus, the product identifier may be an identifier indicating the product type of the connection program (the connection destination side) 111. At any rate, when the same setting table is used in wireless communication, the display apparatuses 110 are configured to produce the same product identifier, and the product identifier is associated 1:1 with the setting table. Therefore, it may be said that the product identifier is specific information for specifying the setting table.

On the other hand, the individual identifier is an identifier including proper information that is individually assigned for each apparatus. Regardless of whether the product type is the same, the individual identifiers will have different values for separate apparatuses. Here, the proper information includes an apparatus serial number, an MAC address, etc.

FIG. 4B shows a function which is realized by the connection program (the connection source side) 121 included in the display apparatus 120 being executed by the CPU 321 as a function related to wireless connection of the information terminal 120.

As shown in FIG. 4B, the information terminal 120 includes a user operation unit 421, a wireless setting holding unit 422, a connection control unit 423, a display control unit 424, an SSID analysis unit 425, an identifier determination unit 426, and a received strength determination unit 427.

The user operation unit 421 accepts, from a user, various operations for conducting wireless connection. In the present embodiment, an operation for turning on the power of the information terminal 120 and an operation for launching the reproduction control program 122 are accepted. The present embodiment is configured such that the reproduction control program 122 is launched to automatically launch the connection program 121 (the connection source side).

When the information terminal 120 wirelessly communicates with the display apparatus 110, the wireless setting holding unit 422 holds setting tables 441, 442, . . . , which have stored therein setting information which is set in the information terminal 120. It is assumed that the same setting table as the setting 431 held in the display apparatus 110 is included in the setting tables 441, 442, . . . , held in the wireless setting holding unit 422. As described below, the information terminal 120 is configured to be able to wirelessly communicate with the display apparatuses 110 having different product identifiers. Therefore, in the wireless setting holding unit 422, multiple setting tables corresponding to the respective product identifiers are held. Details of the setting table will be described below.

The connection control unit 423 receives a beacon transmitted from the display apparatus 110. Moreover, a network to be a connection destination is set based on an SSID included in the received beacon and determined results in the received strength determination unit 427. Furthermore, based on the product identifier included in the SSID, a setting table (here, the setting table 441) for wirelessly communicating with a connection destination is read from setting tables held in the wireless setting holding unit 422 and setting information in the setting table is set within the information terminal 120.

The display control unit 424 displays, at the output unit 326, a launch screen for launching the reproduction control program 122. Moreover, when the wireless connection with the connection destination network is completed, information on the connection destination, such as an apparatus name, etc., is displayed at the output unit 326.

The SSID analysis unit 425 extracts an SSID includes in the beacon transmitted from the display apparatus 110 and identifies a connection destination network with which the information terminal 120 wirelessly connects. Moreover, the SSID is analyzed to extract the product identifier and the apparatus name included in the SSID.

Based on the product identifier extracted in the SSID analysis unit 425, the identifier determination unit 426 determines whether the apparatus which transmits the beacon including the SSID can be wirelessly connected with the information terminal 120.

More specifically, when the product identifier extracted in the SSID analysis unit 425 is a predetermined product identifier, it is determined that the apparatus can be wirelessly connected.

Moreover, when it is determined that the apparatus can be wirelessly connected, the identifier determination unit 426 determines a setting table corresponding to a product identifier extracted in the SSID analysis unit 425. More specifically, a setting table corresponding to a product identifier extracted is specified from setting tables 441, 442, . . . held in the wireless setting holding unit 422.

The received strength determining unit 427 determines the received strength of a signal for each beacon received in the connection control unit 423 and transmits the determined results to the connection control unit 423.

Overview of Wireless Connection Process

Figure 5:
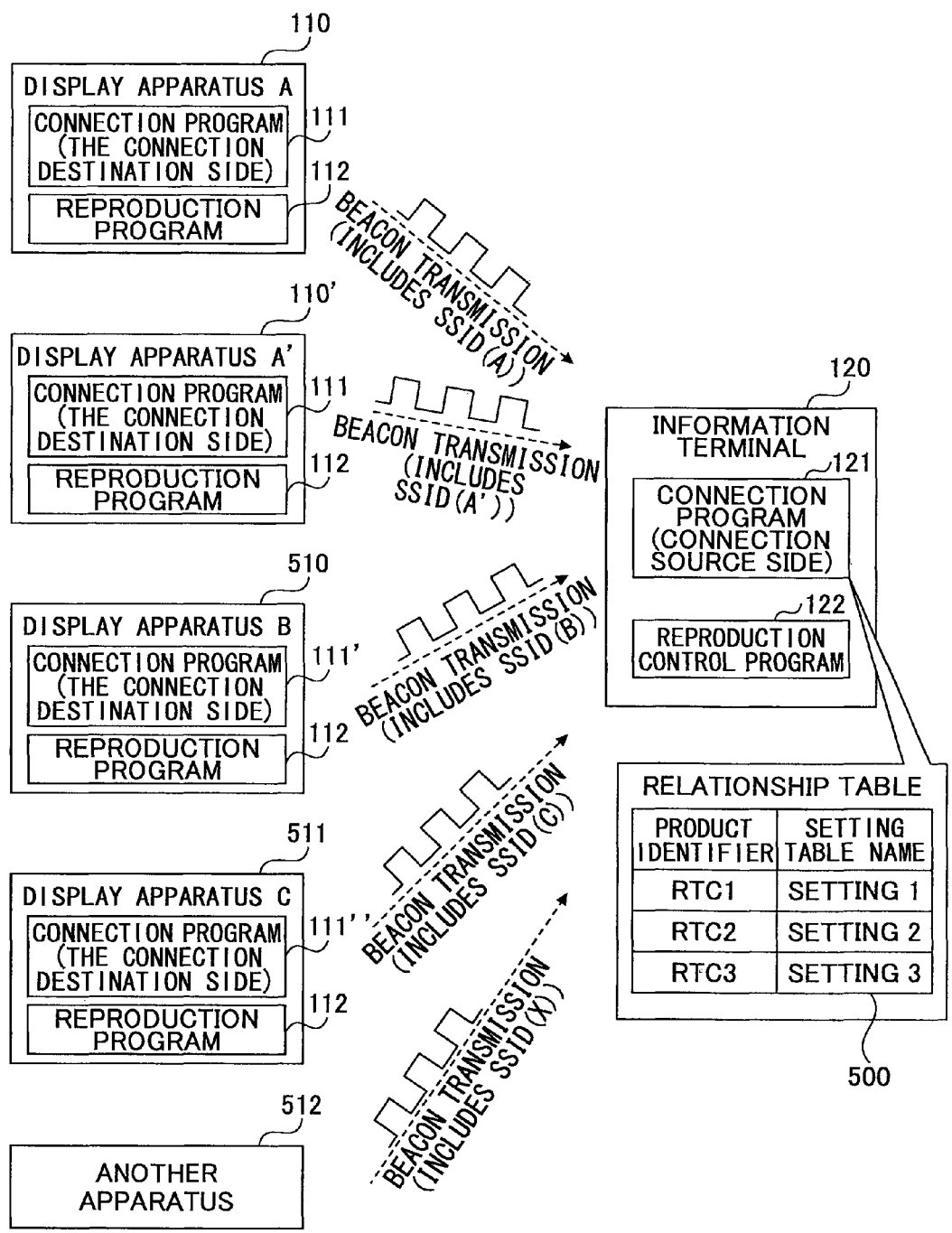
FIG. 5 is a diagram for explaining an overview of a connection process in the reproduction system.

Next, an overview of the wireless connection process in the reproduction system 100 is described using FIG. 5 with reference to FIGS. 4A and 4B. FIG. 5 is a diagram for explaining the overview of the wireless connection process in the reproduction system 100.

An example in FIG. 5 shows a display apparatus A (110), a display apparatus A' (110'), a display apparatus B (510), a display apparatus C (511), another apparatus 512, and an information terminal 120 being arranged in a mutually neighboring manner and the information terminal 120 receiving beacons transmitted from the respective apparatuses.

Here, the display apparatus A (110) and the display apparatus A' (110') are of the same product type, but separate apparatuses. On the other hand, the display apparatus B (510) and the display apparatus C (511) are of product types which differ from a product type of the display display apparatus A (110), and have connection programs (the connection destination side) 111, 111', 111" respectively installed. Moreover, another apparatus 512 differs in product type from the display apparatus A (110) and also does not have the connection program 111 (the connection destination side) according to the present embodiment installed.

Under these circumstances, a beacon including SSID (A) is transmitted from the display apparatus A (110), and a beacon including SSID (A') is transmitted from the display apparatus A' (110'). The display apparatus A (110) and the display apparatus A' (110') are of the same product type, but they are separate apparatuses, so that the individual identifiers thereof differ. Thus, the SSID (A) and the SSID (A') that are produced by the connection program (the connection destination side) 111 which produces the SSID including the individual identifier will be different SSIDs.

Moreover, beacons of SSID (B) and SSID (C) are transmitted from the display apparatus B (510) and the display apparatus C (511). The display apparatus B (510), the display apparatus (511), and the display apparatus A (110), which are of different product types, have different product identifiers and are separate individual apparatuses, so that they also have different individual identifiers. Therefore, SSID (B) and SSID (C) that are produced by the connection program (the connection destination side) 111, 111', 111" will be an SSID different from SSID (A).

Moreover, a beacon of SSID (X) is also transmitted from the other apparatus 512. The connection program (the connection destination side) 111 is not installed in the other apparatus 512, so that the product identifier, the individual identifier, etc., are not described in the SSID (X) included in the beacon transmitted from the other apparatus 512.

In the information terminal 120, the SSID analysis unit 425 of the connection program (the connection source side) 121 extracts the SSID included in the received beacon and the identifier determination unit 426 identifies the wirelessly connectable apparatus based on the extracted SSID. Moreover, the received strength determination unit 427 determines an SSID included in the beacon with the highest received strength out of beacons transmitted by an apparatus identified as wirelessly connectable.

Moreover, the determined SSID is set as a network to be connected by the connection control unit 423. Furthermore, the setting table corresponding to the product identifier included in the determined SSID is read from the wireless setting holding unit 422 and set within the information terminal 120.

A relationship table 500 which indicates the correspondence between the product identifier and the setting table is stored in the connection control unit 423 of the connection program (the connection source side) 121, so that the relationship table 500 is referred to for the identifier determining unit 426 to determine the wirelessly connectable apparatus. More specifically, when an identifier which is the same as any of the product identifiers registered in the relationship table 500 is described at a predetermined position of the SSID, it is determined to be a wirelessly-connectable apparatus. Moreover, when the identifier which is the same as any of the product identifiers registered in the relationship table 500 is not described at the predetermined position of the SSID, it is determined to not to be a wirelessly-connectable apparatus.

Furthermore, even when the connection control unit 423 reads a setting table based on a product identifier, the relationship table 500 is referred to. More specifically, the product identifier included in the determined SSID is searched for in the relationship table 500 to specify a setting table name of a setting table that is registered in association with the product identifier.

Configuration of SSID

Figure 6:
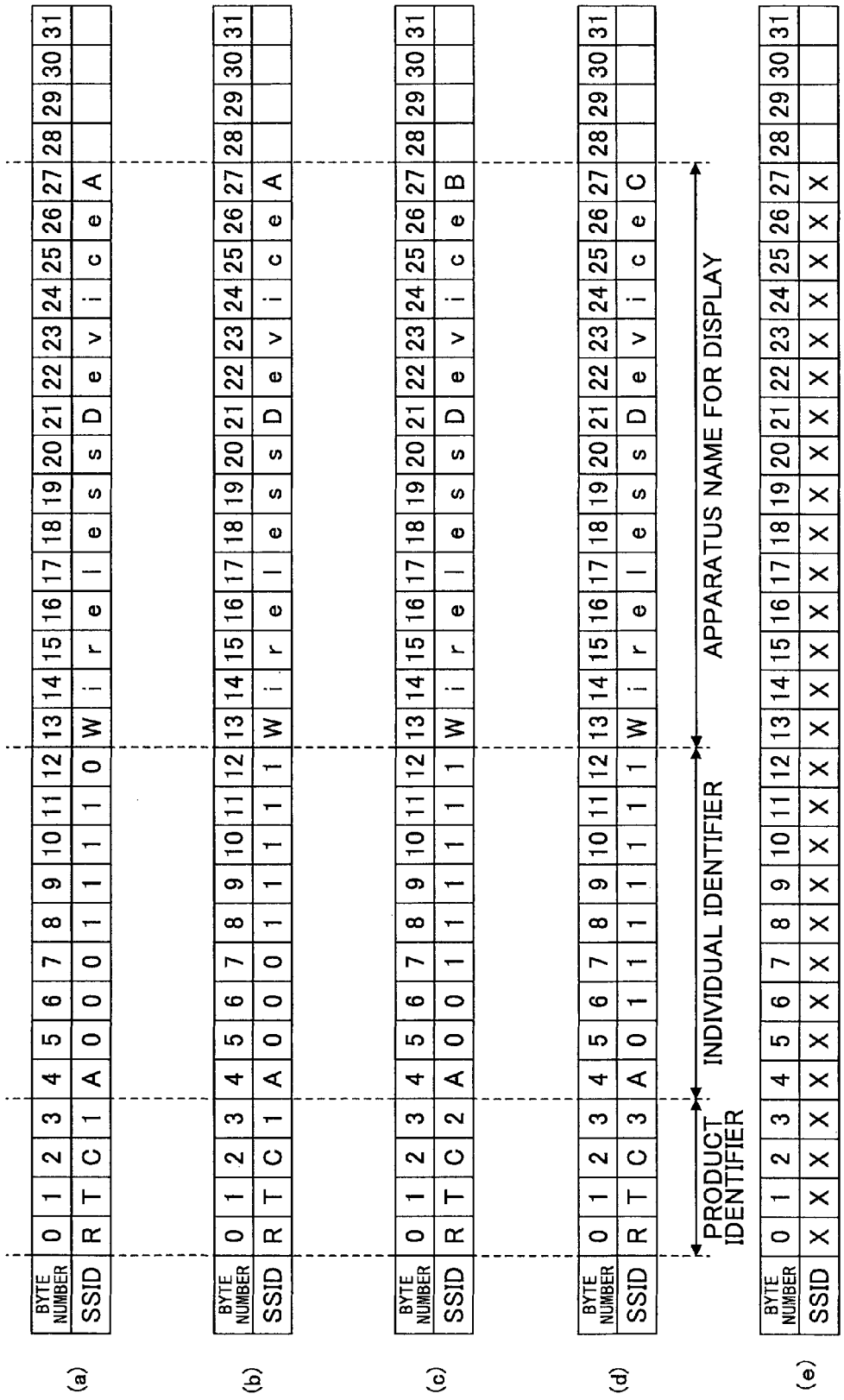
FIG. 6 is a diagram for explaining an example of an SSID included in a beacon transmitted by a display apparatus which is one example of a communication apparatus on the connection destination side.

Next, a configuration of an SSID produced by the SSID production unit 414 of the connection program (the connection destination side) 111 is described. FIG. 6 is a diagram for explaining a configuration of SSIDs produced by the SSID production unit 414 of the connection program (the connection destination side) 111, etc., included in the respective apparatuses in FIG. 5.

As shown in FIG. 6, the SSID includes 32 bytes. Of the SSIDs shown in FIG. 6, (a)-(d) respectively are SSIDs produced by the connection program (the connection destination side) 111, etc. In other words, they are respectively SSIDs produced in the display apparatus (110), the display apparatus A' (110'), the display apparatus B (510), and the display apparatus C (511) in FIG. 5.

As shown in (a)-(d) in FIG. 6, for the SSIDs produced by the connection program (the connection destination side) 111, etc., a character sequence representing the product identifier is described for bytes 0-3. For bytes 4-12, the individual identifier is described. For bytes 13-27, information on a communication apparatus on the connection destination side is described. Information on the communication apparatus on the connection destination side may be an apparatus name, etc., for example; the apparatus name is used when an apparatus transmitting a beacon including the SSID is displayed at the information terminal 120.

Bytes 28-31 which represent a reserved column are used when information on the communication apparatus on the connection destination side falls beyond byte 27.

Here, the display apparatus A (110) which produces the SSID of (a) in FIG. 6 and the display apparatus A' (110') which produces the SSID of (b) in FIG. 6 are of the same product type. Thus, the same character sequence is described for the product identifiers in bytes 0-3. Moreover, the same character sequence is described for the apparatus names in bytes 13-27.

On the other hand, the display apparatus A (110) and the display apparatus A' (110') are separate individual apparatuses, so that different numbers are described for the individual identifiers in bytes 4-12.

Moreover, the display apparatus B (510) which produces the SSID in (c) in FIG. 6 and the display apparatus C (511) which produces the SSID in (d) in FIG. 6 are of a product type different from that of the display apparatus A (110) which produces the SSID in (a) in FIG. 6 and are separate individual apparatuses. Therefore, different character sequences or numbers are described in the product identifier in bytes 0-3, the individual identifier in bytes 4-12, and the apparatus name in bytes 13-27.

The SSID in (e) in FIG. 6 is an SSID produced by the other apparatus 512 in which the connection program (the connection destination side) 111 is not installed. Therefore, the SSID is configured in accordance with a format different from that of the SSID in (a)-(d) in FIG. 6.

Configuration of Setting Table

Next, setting tables held in the wireless setting holding unit 412 of the connection program (the connection destination side) 111 and/or the wireless setting holding unit 422 of the connection program (the connection source side) 121 are described.

FIGS. 7A, 7B, and 7C are diagrams illustrating exemplary setting tables. As shown in FIGS. 7A-7C, names ("setting 1", "setting 2", "setting 3") of the setting tables are given in the setting tables, respectively.

Items to be set in the display apparatus 110 and the information terminal 120 in conducting wireless communication include a communication mode, an authentication scheme, an encryption scheme, a frequency channel, a transmission standard, a communication protocol, an IPv4 address of a wireless apparatus to be connected, an IPv4 subnet mask address, etc.

An ad-hoc mode or a soft AP (access point) mode is set for the communication mode. The soft AP mode is a mode which causes a display apparatus to function as an access point at the software level.

As for the authentication scheme and the encryption scheme, various known techniques may be adopted. For example, exemplary encryption schemes include WEP (wired equivalent privacy) and WPS (Wi-Fi Protected Setup).

The communication protocol may be IPv (Internet protocol version) 4, IPv6, or a different proprietary protocol. An IPv4 address and an IPv4 subnet mask address are used as a pair and take mutually corresponding values. An IPv6 and an IPv6 prefix also similarly take mutually corresponding values.

In the setting table, a frequency channel and a transmission standard are included in addition to the above-described items. In the transmission standard, the type of IEEE 802 is specified.

In the present embodiment, when wirelessly connecting with the display apparatus A (110) or the display apparatus A' (110'), the setting table (setting 1) in FIG. 7(a) is used. Moreover, when wirelessly connecting with the display apparatus B (510) and the display apparatus C (511), the setting table (setting 2 or setting 3) in FIG. 7B or FIG. 7C is used (see the relationship table 500 in FIG. 5).

Flow of Connection Process in Reproduction System

Next, a flow of the connection process in the reproduction system 100 is described. FIGS. 8 and 9 are sequence diagrams showing a flow of the connection process in the reproduction system 100.

First, the user turns on the power of the information terminal 120, launches the reproduction control program 122 to launch the connection program (the connection source side) 121 (step S801). Next, the power of the respective display apparatuses is turned on to launch the reproduction program 112 (step S802).

In the respective display apparatuses, when the power is turned on to launch the connection program (the connection destination side) 111, predetermined setting information is set (step S803), and the SSID including the individual identifier and the product identifier of an own apparatus is produced (step S804).

More specifically, for the display apparatus A (110), setting information based on the setting table (setting 1) in FIG. 7A is set and the SSID in (a) in FIG. 6 is produced. Moreover, for the display apparatus A' (110'), setting information based on the setting table (setting 1) in FIG. 7A is set and the SSID in (b) in FIG. 6 is produced. Setting of the setting information here includes new setting of setting information as well as changing of setting information which has already been set.

Moreover, for the display apparatus B (510), setting information based on the setting table (setting 2) in FIG. 7B is set and the SSID in (c) in FIG. 6 is produced. For the display apparatus C (511), setting information based on the setting table (setting 3) in FIG. 7C is set and the SSID in (d) in FIG. 6 is produced.

Next, the respective display apparatuses transmit a beacon including the SSID respectively produced in step S804 (step S805). In the information terminal 120, the beacons transmitted from the respective display apparatuses are received and stored (step S806).

Next, the user turns on the power of the other apparatus 512 (step S807). Also in the other apparatus 512, when the power is turned on, predetermined setting information is set (step S808) and an SSID is produced (step S809). In the other apparatus 512, the connection program (the connection destination side) 111 is not installed, so that the SSID including the product identifier and the individual identifier of the own apparatus is not produced ((e) in FIG. 6). In the other apparatus 512, the setting information to be set may be any one of the setting tables exemplified in FIGS. 7A-7C, or any other setting table.

Next, the other display apparatus 512 transmits a beacon including the SSID produced in step S809 (step S810). In the information terminal 120, the beacon transmitted from the other apparatus 512 is received and stored (step S811).

Next, the process proceeds in FIG. 9. In the information terminal 120, the SSIDs are obtained from all of the beacons stored in steps S806 and S811 (step S901). More specifically, from the beacon of the display apparatus A (110), the SSID shown in (a) in FIG. 6 is obtained as an SSID. Moreover, the SSID shown in (b) in FIG. 6 is obtained from the beacon of the display apparatus A' (110'); the SSID shown in (c) in FIG. 6 is obtained from the beacon of the display apparatus C (510); and the SSID shown in (d) in FIG. 6 is obtained from the beacon of the display apparatus C (511). Moreover, the SSID shown in (e) in FIG. 6 is obtained from the other apparatus 512.

Next, an SSID in which the product identifier is included is selected from all SSIDs obtained (step S903). As described above, for the SSID produced by the connection program (the connection destination side) 111, etc., the character sequence showing the product identifier is described in bytes 0-3. Thus, it is determined whether a product identifier corresponding to the product identifier which is recognized by the information terminal 120 (which is registered in the relationship table 500) is described in bytes 0-3 with reference to the relationship table 500, and the SSID determined to be described is selected. Here, the SSIDs shown in (a)-(d) in FIG. 6 are selected.

Next, of the SSIDs in which the product identifier is included, an SSID with the maximum received beacon strength is determined (step S903). FIG. 10 is a diagram which summarizes the relationship among a network specified by the SSID included in the respective beacons received; a setting table associated with the product identifier included in the SSID; and a received strength of the respective beacons. Here, the SSIDs shown in FIG. 6 in (a) to (d) are respectively represented as SSID (A), SSID (A'), SSID (B), and SSID (C).

The individual identifiers are included in the respective SSIDs, so that the SSIDs do not overlap among the multiple display apparatuses. Therefore, as shown in FIG. 10, even when the same setting table is set to result in the same IP address, the SSIDs differ, so that no collision of IP addresses occurs among the respective display apparatuses.

In the example of FIG. 10 is shown a case in which the received strength of the beacon transmitted by the display apparatus A (110) is maximal and SSID (A) is selected.

Next, the network of the SSID (SSID (A) here) selected in step S903 is determined to be a network with which the information terminal 120 is to be wirelessly connected. Then, the network of the selected SSID (SSID (A) here) is specified as the connection destination network (step S904).

Next, the setting table associated with the product identifier included in the SSID selected in step S903 is specified by referring to the relationship table 500 (here, "the setting 1" is specified). Then, the setting table is read and the setting information used in wireless communication in the information terminal 120 is set (step S905).

Next, in the information terminal 120, the fact that setting of the wireless connection has been completed is transmitted to the connection destination (the display apparatus A here). Moreover, information on the connection destination is displayed at the output unit 326 of the information terminal 120 (step S907). More specifically, information on the connection destination that is included in bytes 13-27 of the SSID is extracted and displayed at the output unit 326.

Figure 11:
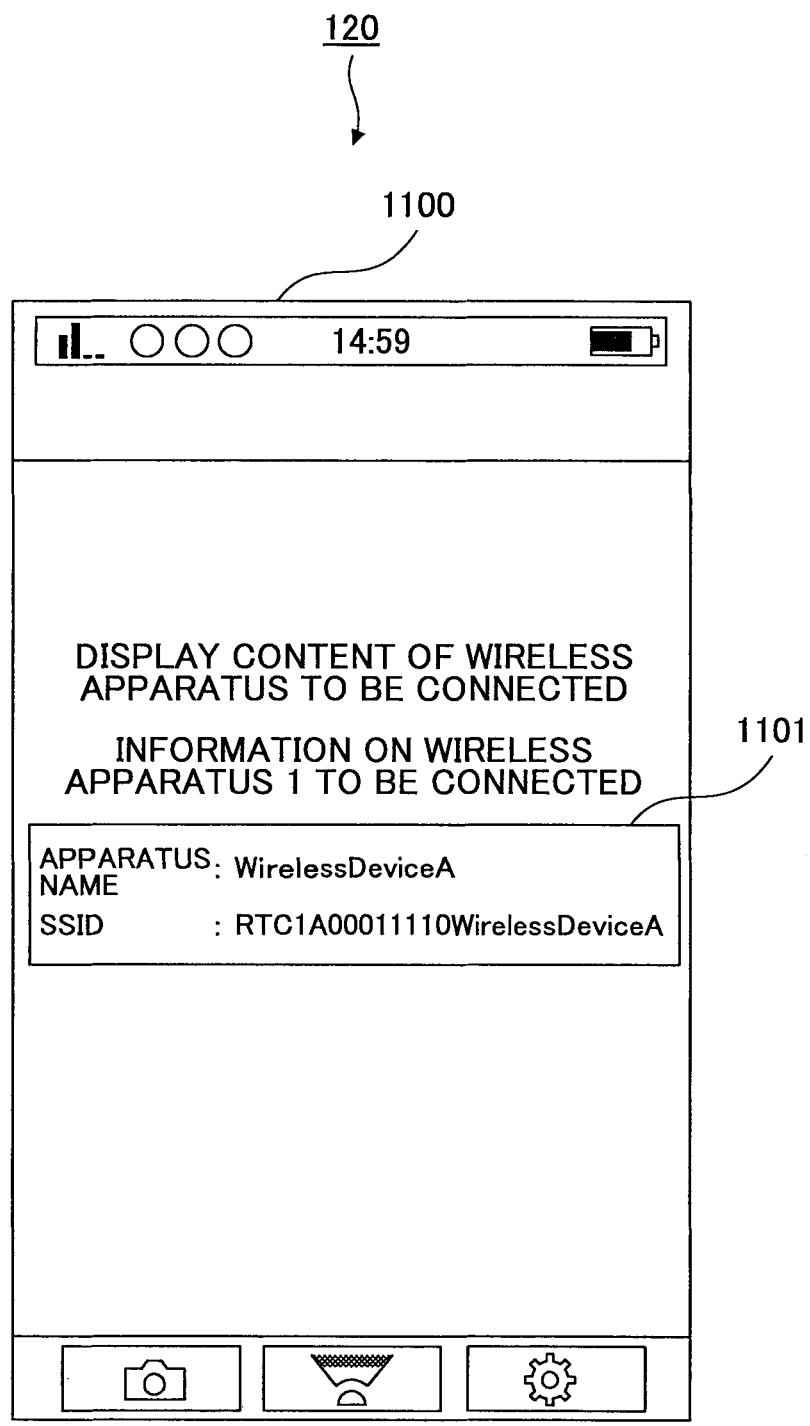
FIG. 11 is a diagram illustrating one example of a display screen displayed on an information display when the connection destination is determined.

FIG. 11 is a diagram illustrating one example of a display screen 1100 which is displayed on the output unit 326 of the information terminal 120. As shown in FIG. 11, on the display screen 1100, an apparatus name and an SSID are displayed as information 1101 on the connection destination with which a wireless connection is made.

When the information on the connection destination is explicitly indicated and the fact that the wireless connection has been made is recognized, the user, via the information terminal 120, inputs an instruction necessary for producing reproduction content data to be reproduced in the display apparatus 110 and inputs an instruction necessary for producing reproduction control information. Moreover, when production of the reproduction content data and production of the reproduction control information are completed, an instruction is made to transmit the reproduction content data and the reproduction control information to the display apparatus 110 (step S908).

In the information terminal 120, the reproduction control program 122 is executed to produce the reproduction content data and the reproduction control information and transmit the produced reproduction content data and reproduction control information to the display apparatus A (110) (step S909). This makes it possible to reproduce reproduction content data based on reproduction control information in the display apparatus A (110).

SUMMARY

As is evident from the above-described explanations, in the present embodiment, a display apparatus which is a communication apparatus on the communication destination side and an information terminal which is a communication apparatus on the connecting source side are respectively configured to hold setting tables in which is stored setting information used in wireless communication.

The display apparatus which is the communication apparatus on the communication destination side is configured to transmit a beacon including an SSID which describes a product identifier at a predetermined position in order to specify which setting table to be used.

The display apparatus which is the communication apparatus on the communication destination side is configured to include an individual identifier on the SSID in order to properly identify a network built by an own apparatus.

The information terminal which is a communication apparatus on the connecting source side is configured to determine whether a product identifier is described at a predetermined position of the SSID included in the received beacon to determine the wireless connectability of the communication apparatus.

The information terminal is configured to specify, as a network with which the information terminal connects, the network of the SSID included in the beacon with the maximum received strength at the time of beacon reception when there are multiple wirelessly-connectable communication apparatuses.

The information terminal which is the communication apparatus on the connecting source side is configured to conduct setting of setting information in the setting table associated with the product identifier described in the SSID included in the beacon with the maximum received strength.

In this way, the communication apparatus on the connection source side conducts setting necessary for wireless communication based on the product identifier included in the beacon, facilitating connection operations. Moreover, there is no need to scan the network to be the connection destination, making it possible to shorten the scanning time.

Furthermore, both the communication apparatus on the connection destination side and the communication apparatus on the connection source side are provided with corresponding setting tables and the product identifier is described in the SSID included in the beacon to specify which setting table is to be used, so that there is no need to mutually transmit, after setting, the set results. This makes it possible to shorten the time up to starting transmission/reception of data (for example, transmission/reception of reproduction content data and reproduction control information).

As a result, the present embodiment makes it possible to speedily conduct a wireless connection between communication apparatuses.

In addition to the above-described advantages, the present embodiment provides the advantages as follows.

For example, the setting table is determined in accordance with the product identifier, making it possible for the description of the SSID to fall within the byte length of the SSID regardless of the version of the IP address. Therefore, depending on the version of the IP address, circumstances such that the communication apparatus on the connection destination side is no longer able to transmit a beacon for conducting setting necessary for wireless communication may be avoided.

Moreover, the individual identifier is described in the SSID to properly identify the network built by the display apparatus which is the communication apparatus on the connection destination side, so that no collision of IP addresses occurs when the same setting table is used among different display apparatuses. As a result, the number of setting tables to be held in advance may be suppressed.

Moreover, even when there are multiple communication apparatuses, one connection destination is determined based on the received signal strength, and the user may merely turn on the power and launch the connection program to realize the wireless connection. In other words, the connection operations are facilitated significantly.

Second Embodiment

While the connection process up to when the display apparatus which is the communication apparatus on the connection destination side and the information terminal which is the communication apparatus on the connection source side makes the wireless connection is described above in the first embodiment, the present invention is not limited thereto. For example, it may be configured such that, even when the wireless connection is completed and the communication process (the process of transmitting/receiving reproduction content data and reproduction control information) is being executed, beacons are monitored and a connection destination is automatically switched.

Connection Destination Switching Process

Figure 12:
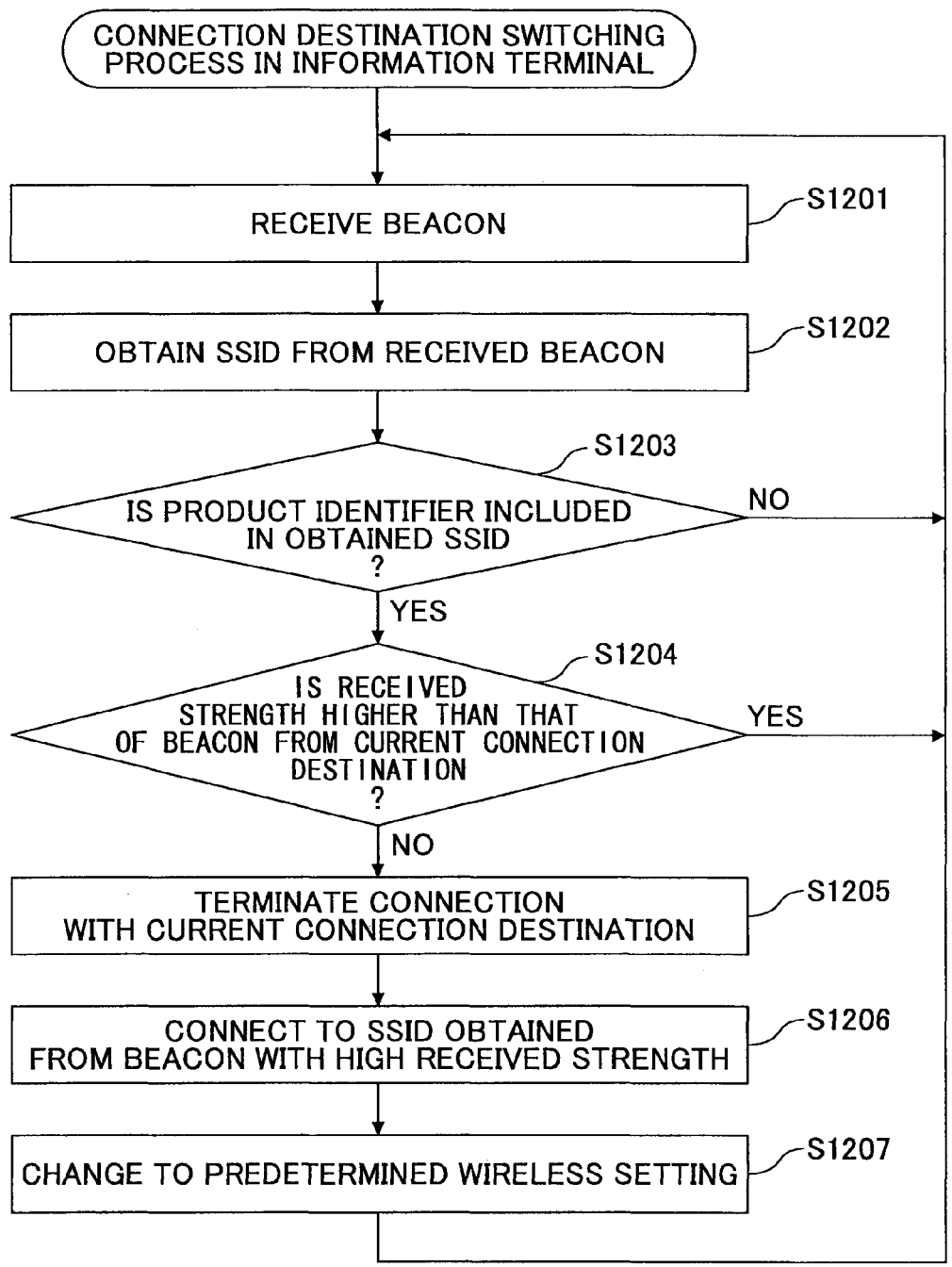
FIG. 12 is a flowchart illustrating a flow of a connection destination switching process in an information terminal which is one example of a communication apparatus on the connection source side.

The connection destination switching process after completion of the wireless connection process is described using FIG. 12. FIG. 12 is a flowchart illustrating a flow of the connection destination switching process after completion of the wireless connection process. When the wireless connection process is completed, the process shown in FIG. 12 is started.

In step S1201, reception of a beacon is continued. In step S1202, the SSID analysis unit 425 obtains an SSID included in the received beacon.

In step S1203, the identifier determination unit 426 determines whether a product identifier is described in bytes 0-3 of the SSID obtained in step S1202. More specifically, it is determined whether a product identifier corresponding to the product identifier recognized by the information terminal 120 is described in bytes 0-3 of the obtained SSID with reference to the relationship table 500.

In step S1203, when it is determined that the product identifier is not described, it is determined that the apparatus transmitting the beacon is not a wirelessly-connectable apparatus, and the process thus returns to step S1201.

On the other hand, when it is determined in step S1203 that the product identifier is described, the process proceeds to step S1204. In step S1204, the received strength determination unit 427 obtains the received strength of the beacon which includes the SSID in which the product identifier is determined to be described in step S1203. Then, a comparison is made with the received strength of the beacon transmitted from the connection destination (for example, the display apparatus A (110)) with which a wireless connection is made at this time.

As a result of the comparison in step S1204, when it is determined that the received strength of the beacon transmitted from the connection destination with which the wireless connection is made at this time is higher, the process returns to step S1201.

On the other hand, as a result of the comparison, when it is determined that the received strength of the beacon which includes the SSID in which the product identifier is determined to be described in step S1203 is higher than the received strength of the beacon transmitted from the connection destination with which the wireless connection is made, the process proceeds to step S1205.

In step S1205, the connection control unit 423 terminates the wireless connection with the connection destination with which the wireless connection is made at this time. Moreover, in step S1206, a connection is made to a network of an SSID which is determined to describe the product identifier (for example, a network of SSID (B) in the display apparatus B (510)) in step S1203.

In step S1207, a setting table (setting 2) associated with a product identifier of the SSID determined to describe the product identifier in step S1203 is read and setting information is set based on the setting table.

In this way, the user, for example, can merely carry the information terminal 120 and move to automatically switch the connection destination of wireless connection.

SUMMARY

As evident from the above-described explanations, in the present embodiment, the information terminal 120 is configured to monitor the beacon even after completion of the wireless connection process.

For the beacon for which the product identifier is described in the SSID, it is configured to determine the received strength of the beacon and compare with the received strength of the beacon transmitted from the connection destination which is wirelessly connecting at this time.

It is configured that, as a result of comparison of the received beacon strengths, when there is a beacon with the received strength which is higher than that of the beacon transmitted from the connection destination with which a wireless connection is made at this time, the connection is immediately switched to the network of the SSID included in the beacon.

This makes it possible to speedily switch the wireless connection even after the wireless connection process is completed.

Third Embodiment

In the second embodiment, the information terminal 120 is configured that, as a result of comparison, when there is a beacon with the received strength which is higher than that of the beacon transmitted from the connection destination which is wirelessly connecting at this time, a connection is switched to the network of the SSID included in the beacon.

However, the present invention is not limited thereto. For example, it may be configured to, when transmission/reception of data (for example, reproduction content data and reproduction control information) are conducted between the display apparatus which is the communication apparatus on the connection destination side and the information terminal which is the communication apparatus on the connection source side at the time of switching, conduct switching after transmission/reception is completed.

Figure 13:
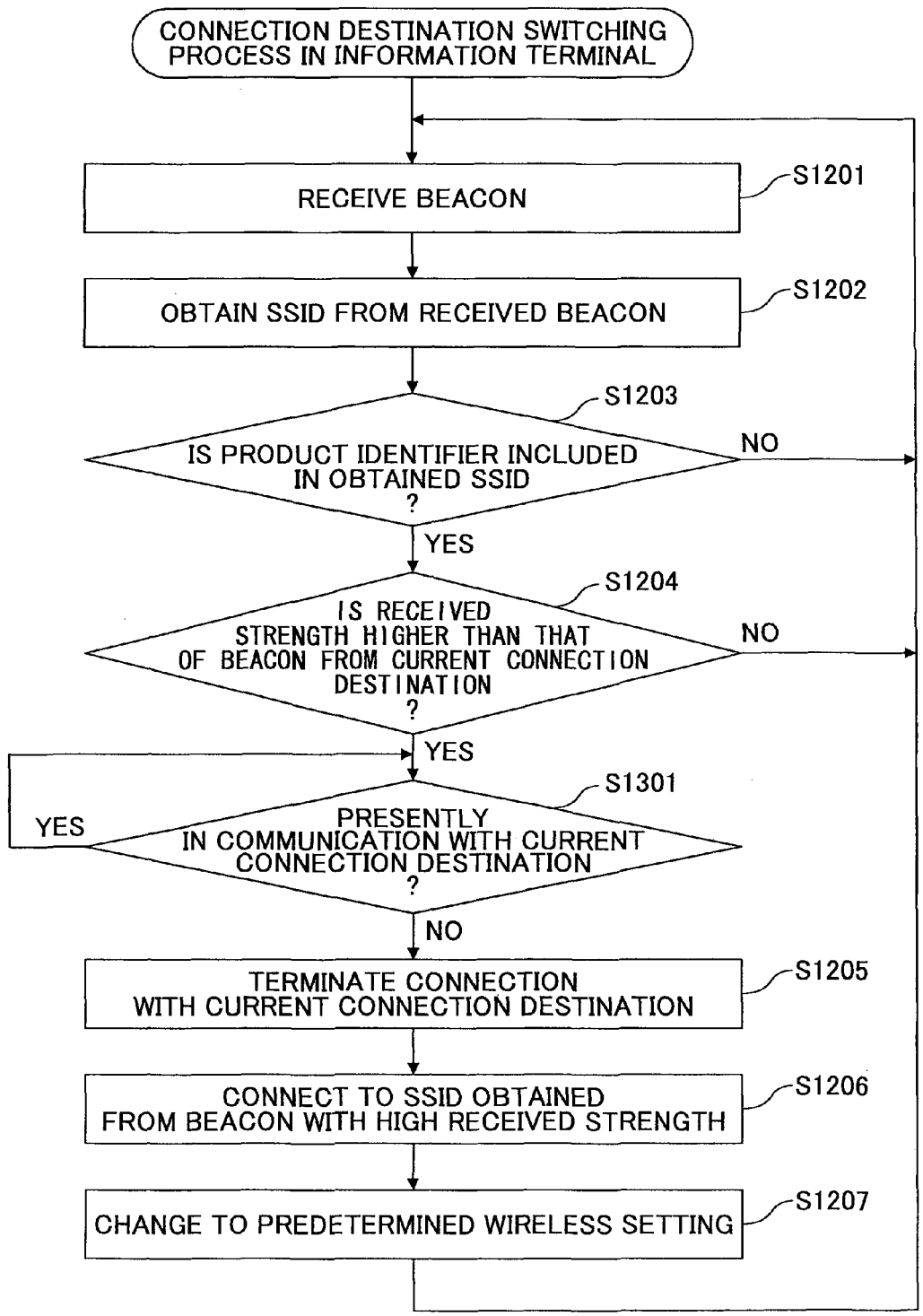
FIG. 13 is another flowchart illustrating the flow of the connection destination switching process in the information terminal.

FIG. 13 is a flowchart illustrating a flow of the connection destination switching process after completion of the wireless connection process in the information terminal 120. The same reference letter is given to the same process as the flowchart in FIG. 12 that is described in the second embodiment, so that explanations are omitted.

The difference from FIG. 12 is in the process for determining that the received strength of the beacon including the SSID in which the product identifier is determined to be described is higher in step S1204.

In this case, in the present embodiment, in step S1301, the connection control unit 423 determines whether transmission/reception of data are conducted with the connection destination with which the wireless connection is made. When it is determined in step S1301 that the transmission/reception of the data are being conducted, the process waits until the transmission/reception of the data are completed.

On the other hand, when it is determined in step S1301 that the transmission/reception of the data are not being conducted, the process proceeds to step S1205.

This makes it possible to conduct switching of the connection destination without interrupting the transmission/reception of the data.

Fourth Embodiment

While, in the second/third embodiments, the information terminal 120 is configured to automatically switch the connection destination of the wireless connection in accordance with the received strength of the beacon, it is not limited thereto. For example, it may be configured to display an inquiry message for a user before switching and switch the connection destination of the wireless connection when the switching instruction is input by the user as a response to the inquiry message.

Figure 14:
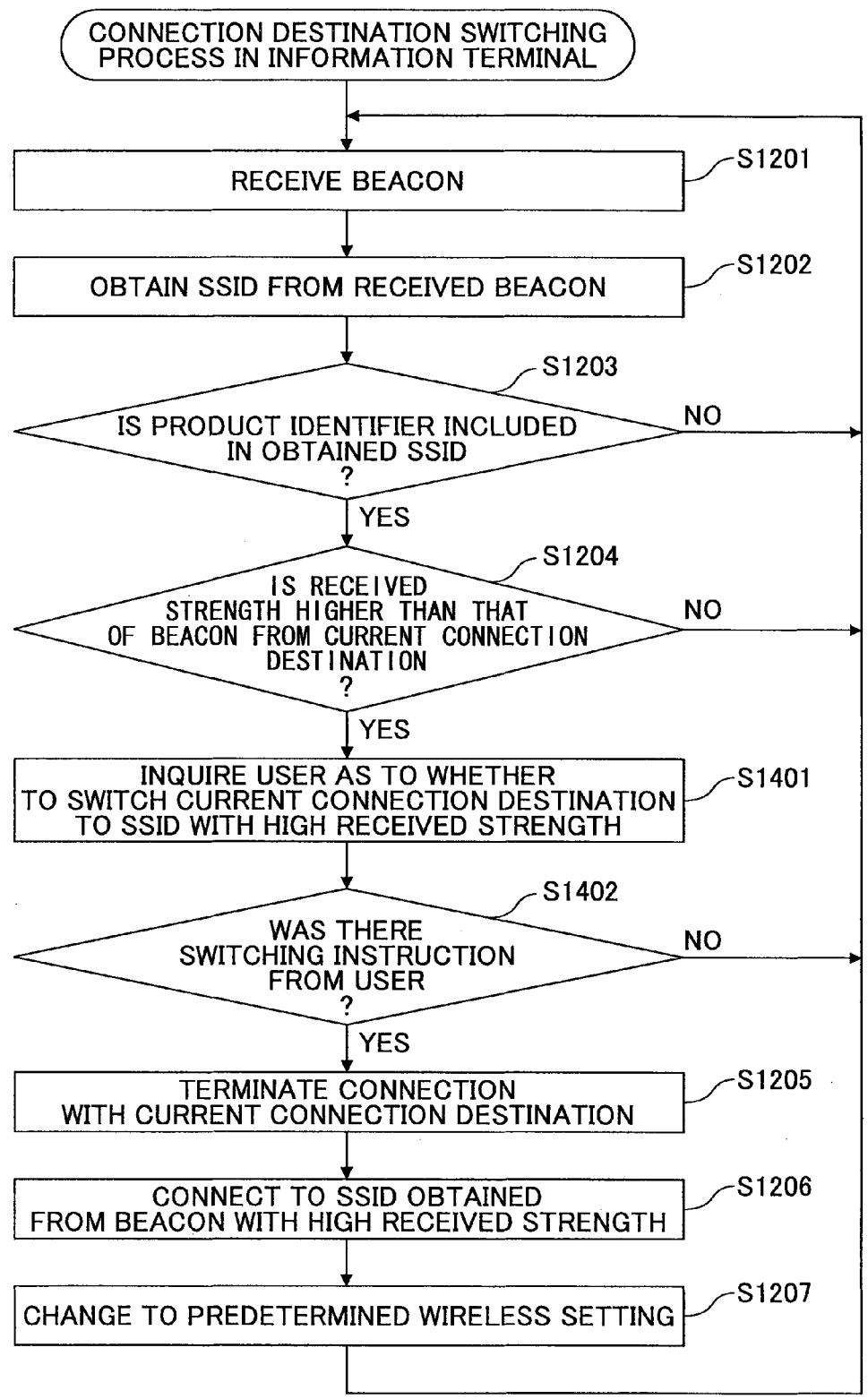
FIG. 14 is yet another flowchart illustrating the flow of the connection destination switching process in the information terminal.

FIG. 14 is a flowchart illustrating a flow of the connection destination switching process after completion of the wireless connection process in the information terminal 120. The same reference letter is given to the same process as the flowchart in FIG. 12 that is described in the second embodiment, so that explanations are omitted.

The difference from FIG. 12 is in the process for determining that the received strength of the beacon including the SSID in which the product identifier is determined to be described is higher in step S1204.

In this case, in the present embodiment, the display control unit 424 makes an inquiry to the user as to whether the connection destination with which the wireless connection is made is switched to a network of the SSID included in the beacon with a high received strength in step S1401.

In step S1402, if the user operation unit 421 accepts an instruction that switching is not to be conducted as a response to the inquiry in step S1401, the process returns to step S1201. On the other hand, if the user operation unit 421 accepts an instruction that switching is to be conducted as the response to the inquiry in step S1401, the process proceeds to step S1205.

In this way, it is configured to conduct switching based on instructions of the user to make it possible to avoid circumstances such that the connection destination of wireless connection switches against the intention of the user.

Fifth Embodiment

While, in the second/third embodiments, it is configured to automatically switch the connection destination of the wireless connection in accordance with the received strength of the beacon, the present invention is not limited thereto. For example, it may be configured for the user to specify the timing of automatic switching.

Figure 15:
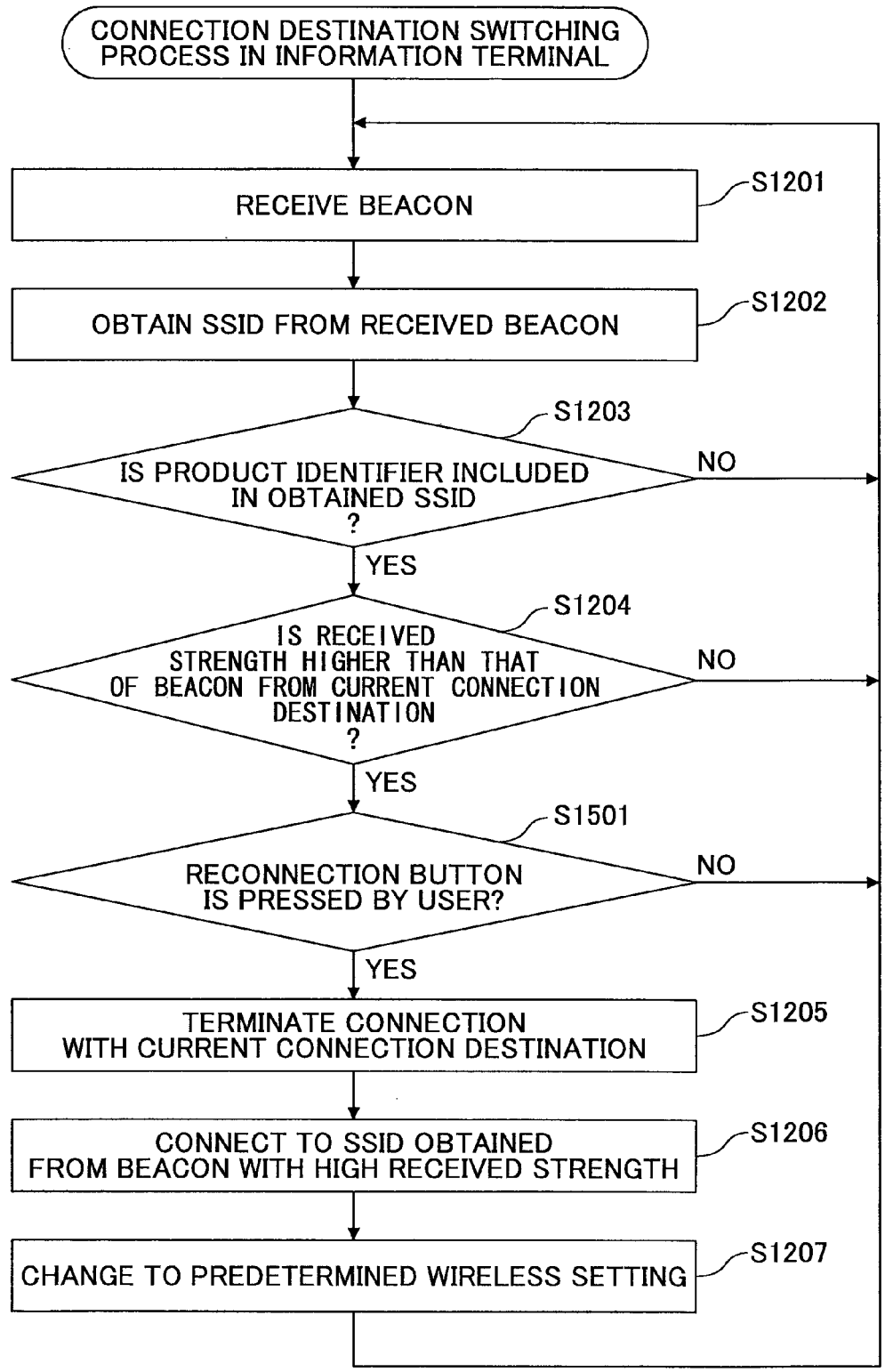
FIG. 15 is a further flowchart illustrating the flow of the connection destination switching process in the information terminal.

FIG. 15 is a flowchart illustrating a flow of the connection destination switching process after completion of the wireless connection process in the information terminal 120. The same reference letter is given to the same process as the flowchart in FIG. 12 that is described in the second embodiment, so that repeated explanations are omitted.

The difference from FIG. 12 is in the process for determining that the received strength of the beacon including the SSID in which the product identifier is determined to be described is higher in step S1204.

In this case, in the present embodiment, the user operation unit 421 determines, in step S1501, whether a reconnection button (not shown) is pressed by the user. If it is determined, in step S1501, that the reconnection button is not pressed by the user, the process returns to step S1201. In other words, even when there is a switching destination, unless there is an instruction from the user, switching to the switching destination does not occur.

On the other hand, if the user operation unit 421 determines, in step S1501, that the reconnection button is pressed, the process proceeds to step S1205. In other words, switching to the switching destination occurs at the timing at which an instruction from the user is input.

When there is no switching destination, even if the instruction from the user is input, switching to the switching destination does not occur.

Other Embodiments

While the first embodiment is configured to determine an SSID with the highest received beacon strength, the present invention is not limited thereto. For example, it may be configured to determine an SSID with a received strength of the beacon that is higher than or equal to a predetermined received strength. Alternatively, it may also be configured to determine an SSID with a received strength within a predetermined range. In other words, it may be configured to determine an SSID which meets a predetermined condition for the received strength of the beacon.

While the respective embodiments are configured to describe a product identifier in bytes 0-3 and an individual identifier in bytes 4-12 in producing the SSID, the present invention is not limited thereto. The positions at which the product identifier and the individual identifier are described may be arbitrary positions as they are predetermined between the connection program (the connection destination side) 111 and the connection program (the connection source side) 121.

While a reproduction system is referred to in the respective embodiments as one example of a communication system according to the present invention, the present invention is not limited thereto. It may be any system as long as it is a system which wirelessly connects together electronic equipment units via a network and conducts transmission/reception of data.

For example, while equipment units such as a projector 211, a display, etc., are exemplified in the respective embodiments as an electronic equipment unit which makes up a communication system 100, the present invention is not limited thereto. FIGS. 16A-16C are diagrams illustrating one example of a system configuration when a communication system 100 is configured using various electronic apparatuses.

As shown in FIGS. 16A and 16B, a communication system 100 may be configured using an electronic apparatus such as a teleconferencing system 1601, an electronic whiteboard 1602, etc., for example. Alternatively, as shown in FIG. 16C, the communication system 100 may be configured using an electronic apparatus having a printing function, such as an MFP (multi-function peripheral) 1603, a printer (not shown), etc. For an electronic apparatus having a printing function such as an MFP 1603, a printer, etc., the information terminal 120 may be configured to transmit printing data instead of reproduction content data.

While the present invention has been described in the above based on the respective embodiments, the present invention is not limited to requirements shown in the above-described embodiments. These points may be changed within the range of not compromising the gist of the present invention and may be appropriately determined in accordance with the application thereof.

The present application is based on and claims the benefit of priorities of Japanese Priority Application No. 2013-185113 filed on Sep. 6, 2013 and Japanese. Priority Application No. 2014-114311 filed on Jun. 2, 2014.

DESCRIPTION OF THE REFERENCE NUMERALS

100 Reproduction system
110 Display apparatus
111 Connection program (the connection destination side)
112 Reproduction program
120 Information terminal
121 Connection program (the connection source side)
122 Reproduction control program
211 Projector
212 Screen
411 User operation unit
412 Wireless setting holding unit
413 Connection control unit
414 SSID production unit
415 Identifier production unit
421 User operation unit
422 Wireless setting holding unit
423 Connection control unit
424 Display control unit
425 SSID analysis unit
426 Identifier determination unit
427 Received strength determination unit

PATENT DOCUMENTS

Patent document 1: JP2006-254301A
Patent document 2: JP2011-188238A

The invention claimed is:

1. A communication system, comprising:
a first communication apparatus and a second communication apparatus, wherein
the first communication apparatus includes
processing circuitry configured to
produce a network identifier including specific information specifying a setting table in which is stored setting information used in wireless communication between the first communication apparatus and the second communication apparatus, the specific information further including a product identifier of the first communication apparatus that indicates that the first communication apparatus includes a connection program that allows the first communication apparatus to receive content transmitted by the second communication apparatus to be reproduced by the first communication apparatus; and
transmit one or more signals including the produced network identifier, and wherein
the second communication apparatus includes
processing circuitry configured to
identify, of received signals, a signal which both (i) has the specific information included in a network identifier which includes the product identifier and (ii) whose received strength meets a predetermined condition; and
set, in the second communication apparatus, the setting information used in wireless communication between the first communication apparatus and the second communication apparatus using the setting table specified by the specific information included in the network identifier of the identified signal,
wherein for any one of the received signals from a respective communication apparatus that does not include specific information further including a product identifier that indicates that the respective communication apparatus includes the connection program, the processing circuitry of the second communication apparatus determines that the respective communication apparatus is not wirelessly connectable with the second communication apparatus, a received strength of signal will not be obtained, and setting information will not be set in the second communication apparatus with regard to the respective communication apparatus.

2. A communication control system, comprising:
a first communication apparatus and a second communication apparatus which is configured to execute a connection program and which wirelessly connects with the first communication apparatus, wherein
the first communication apparatus includes
processing circuitry configured to
produce a network identifier including specific information specifying a setting table in which is stored setting information used in wireless communication between the first communication apparatus and the second communication apparatus, the specific information further including a product identifier of the first communication apparatus that indicates that the first communication apparatus includes a second connection program that allows the first communication apparatus to receive content transmitted by the second communication apparatus to be reproduced by the first communication apparatus; and transmit one or more signals including the produced network identifier, and wherein the connection program causes processing circuitry of the second communication apparatus to execute an identification procedure of identifying, of received signals, a signal which both (i) has the specific information included in the network identifier which includes the product identifier and (ii) whose received strength meets a predetermined condition; and a setting procedure of setting, in the second communication apparatus, the setting information used in wireless communication between the first communication apparatus and the second communication apparatus using the setting table specified by the specific information included in the network identifier of the identified signal, wherein for any one of the received signals from a respective communication apparatus that does not include specific information further including a product identifier that indicates that the respective communication apparatus includes the connection program, the second communication apparatus determines that the respective communication apparatus is not wirelessly connectable with the second communication apparatus, a received strength of signal will not be obtained and setting information will not be set in the second communication apparatus with regard to the respective communication apparatus.

3. The communication control system as claimed in claim 2, wherein the second communication apparatus holds the setting table, and the setting procedure reads the setting table specified by the specific information from the setting table held in the second communication apparatus to set the setting information in the second communication apparatus.

4. The communication control system as claimed in claim 3, wherein the identification procedure refers to a relationship table which associates the specific information and the setting table held in the second communication apparatus, and determines that the specific information is included in the network identifier when the specific information associated in the relationship table is described at a predetermined position of the network identifier included in the received signal.

5. The communication control system as claimed in claim 2, wherein the setting procedure specifies a connection destination network based on the network identifier of the identified signal.

6. The communication control system as claimed in claim 5, wherein the connection program causes the processing circuitry of the second communication apparatus to further execute a switching procedure of switching, when a signal whose received strength is higher than that of the identified signal and which has the specific information included in the network identifier is received, the connection destination network to a network specified by the network identifier included in the received signal.

7. The communication control system as claimed in claim 6, wherein, in the switching procedure, the second communication apparatus switches to the network specified based on the network identifier included in the received signal after communication with the connection destination network is completed.

8. The communication control system as claimed in claim 6, wherein, when the signal whose received strength is higher than that of the identified signal and which has the identifying information included in the network identifier is received and when a predetermined instruction is input by a user, the switching procedure switches the connection destination network to the network specified based on the network identifier included in the received signal.

9. A communication apparatus which is wirelessly connected with another communication apparatus, comprising:

processing circuitry configured to receive a signal having a network identifier including specific information which specifies a setting table in which is stored setting information used in wireless communication between the other communication apparatus and the communication apparatus, the specific information further including a product identifier of the other communication apparatus that indicates that the other communication apparatus includes a connection program that allows the other communication apparatus to receive content transmitted by the communication apparatus to be reproduced by the other communication apparatus;

identify, of received signals, a signal which both (i) has the network identifier including the product identifier and (ii) whose received strength meets a predetermined condition; and set, in the communication apparatus, setting information used in wireless communication between the other communication apparatus and the communication apparatus using a setting table specified by the specific information included in the network identifier of the identified signal, wherein for any one of the received signals from a respective communication apparatus that does not include specific information further including a product identifier that indicates that the respective communication apparatus includes the connection program, the processing circuitry determines that the respective communication apparatus is not wirelessly connectable with the communication apparatus, a received strength of signal will not be obtained and setting information will not be set in the second communication apparatus with regard to the respective communication apparatus.

\* \* \* \* \*